(12) United States Patent
Cesaroni et al.

(10) Patent No.: US 12,545,438 B2
(45) Date of Patent: Feb. 10, 2026

(54) ROCKET MOTOR

(71) Applicant: CESARONI AEROSPACE INCORPORATED, Bowling Green, FL (US)

(72) Inventors: Anthony Joseph Cesaroni, Sarasota, FL (US); Jerry Larson, Bowling Green, FL (US)

(73) Assignee: CESARONI AEROSPACE INCORPORATED, Bowling Green, FL (US)

( * ) Notice: Subject to any disclaimer, the term of this patent is extended or adjusted under 35 U.S.C. 154(b) by 207 days.

(21) Appl. No.: 18/264,992

(22) PCT Filed: Feb. 11, 2022

(86) PCT No.: PCT/US2022/016108
§ 371 (c)(1),
(2) Date: Aug. 10, 2023

(87) PCT Pub. No.: WO2022/216362
PCT Pub. Date: Oct. 13, 2022

(65) Prior Publication Data
US 2024/0150047 A1    May 9, 2024

Related U.S. Application Data

(60) Provisional application No. 63/151,247, filed on Feb. 19, 2021.

(51) Int. Cl.
*B64G 1/40* (2006.01)
*F02K 9/10* (2006.01)
(Continued)

(52) U.S. Cl.
CPC ............... *B64G 1/403* (2013.01); *F02K 9/10* (2013.01); *F02K 9/18* (2013.01); *F02K 9/24* (2013.01);
(Continued)

(58) Field of Classification Search
CPC ... B64G 1/403; F02K 9/08; F02K 9/10; F02K 9/18; F02K 9/28; F02K 9/34; F02K 9/346; F02K 9/36
See application file for complete search history.

(56) References Cited

U.S. PATENT DOCUMENTS 3,713,395 A * 1/1973 Carpenter ............... F02K 9/36
                                                       102/290
4,301,306 A    11/1981 Layer
(Continued)

FOREIGN PATENT DOCUMENTS

CA    2210438 A1    1/1999
CA    2570743 A1    6/2008
(Continued)

OTHER PUBLICATIONS

Exdron, Technical Data Sheet Armstrong™ A-661, Nov. 4, 2020 (Year: 2020).*
(Continued)

*Primary Examiner* — Kyle Robert Thomas
(74) *Attorney, Agent, or Firm* — Ohlandt, Greeley and Perle, LLP.

(57) ABSTRACT

A rocket motor comprises at least two propellant grains/grain segments; a case comprising the propellant grains/grain segments, stacked within the case; and a resin for substantially maintaining the grains/grain segments in position within the case. In another aspect, a rocket motor comprises at least two propellant grains/grain segments, each having an aft-end face and a fore-end face. At least two
(Continued)

of the propellant grains/grain segments comprise a sleeve having propellant cast therein. The motor further comprises a case comprising the propellant grains/grain segments, stacked within the case, wherein the sleeve of one propellant grain/grain segment is coupled to the sleeve of an adjacent propellant grain/grain segment such that the fore-end face of one grain/grain segment is spaced from the aft-end face of an other grain/grain segment creating a gap therebetween. Methods for making the rocket motors are described.

31 Claims, 14 Drawing Sheets

(51) Int. Cl.
*F02K 9/18* (2006.01)
*F02K 9/24* (2006.01)
*F02K 9/28* (2006.01)
*F02K 9/34* (2006.01)
*F02K 9/36* (2006.01)

(52) U.S. Cl.
CPC ............... *F02K 9/28* (2013.01); *F02K 9/34* (2013.01); *F02K 9/343* (2013.01); *F02K 9/346* (2013.01); *F02K 9/36* (2013.01); *F05D 2230/23* (2013.01)

(56) References Cited

U.S. PATENT DOCUMENTS

| | | | |
|---|---|---|---|
| 4,324,717 A | 4/1982 | Layer | |
| 4,421,806 A * | 12/1983 | Marks | C08J 5/04 138/132 |
| 4,819,426 A | 4/1989 | Singer et al. | |
| 4,943,621 A | 7/1990 | Janda et al. | |
| 4,956,971 A * | 9/1990 | Smith | F02K 9/763 60/245 |
| 5,312,940 A | 5/1994 | Grubbs et al. | |
| 5,342,909 A | 8/1994 | Grubbs et al. | |
| 5,342,940 A | 8/1994 | Ono et al. | |
| 5,831,108 A | 11/1998 | Grubbs et al. | |
| 5,849,851 A | 12/1998 | Grubbs et al. | |
| 5,917,071 A | 6/1999 | Grubbs et al. | |
| 6,257,149 B1 | 7/2001 | Cesaroni | |
| 6,383,319 B1 | 5/2002 | Humble et al. | |
| 6,410,110 B1 | 6/2002 | Warner et al. | |
| 6,647,888 B1 | 11/2003 | Cesaroni et al. | |
| 7,204,191 B2 | 4/2007 | Wiley et al. | |
| 7,607,394 B2 | 10/2009 | Cesaroni | |
| 7,958,823 B2 | 6/2011 | Sawka | |
| 8,281,568 B2 * | 10/2012 | Danforth | C06B 45/00 102/288 |
| 10,429,156 B2 | 10/2019 | Burrow | |
| 10,690,464 B2 | 6/2020 | Peterson | |
| 2002/0017278 A1 | 2/2002 | Spinnler et al. | |
| 2003/0164215 A1 | 9/2003 | Woodson et al. | |
| 2004/0024489 A1 | 2/2004 | Fujiki et al. | |
| 2006/0283314 A1 | 12/2006 | Cesaroni | |
| 2007/0075919 A1 | 4/2007 | Breed | |
| 2010/0305261 A1 | 12/2010 | Maljkovic et al. | |
| 2012/0241250 A1 | 9/2012 | Eakin et al. | |
| 2014/0088260 A1 | 3/2014 | Giardello et al. | |
| 2021/0059390 A1 | 3/2021 | Knoblauch | |

FOREIGN PATENT DOCUMENTS

| | | |
|---|---|---|
| WO | 9720865 A1 | 6/1997 |
| WO | 02076613 A1 | 10/2002 |

OTHER PUBLICATIONS

Boyd, Steven E., Mechanical and Impact Characterization of Poly-Dicyclopentadiene (p-DCPD) Matrix Composites Using Novel Glass Fibers and Sizings, ARL-TR-7749, Aug. 2016.
Goetz, Adam E. and Boydston, Andrew J., Metal-Free Preparation of Linear and Cross-Linked Polydicyclopentadiene, J. Am. Chem. Soc. (2015) vol. 137, pp. 7572-7575.
Hayano S., et al., Synthesis, Characterization, and Properties of Crystalline Poly(Endo-Dicyclopentadiene) Resin Made via Cis- and Isoselective Bulk Ring-Opening Metathesis Polymerization, J. Polym. Sci Part A: Poly. Chem. (2006) vol. 44, pp. 3153-3158.
K. Kosanke, Terminology of Model Rocketry Explained, Issue 321, Apogee Components, Inc., Sep. 11, 2012.
Kovacic S. and Slugov C., Ring-Opening Metathesis Polymerisation Derived Poly(Dicyclopentadien) Based Materials, Mater. Chem. Front., (2020), vol. 4, pp. 2235-2255.
Long, A. K. et al., Static Thrust Measurement of Two Types of Perforated Solid Propellant Grain Configurations; Journal of Aerospace Engineering (2012) pp. 653-659.
Phatake, Ravindra S. et al., Turning Thermal Properties of Cross-Linked DCPD Polymers by Functionalization, Initiator Type and Curing Methods, Polym. Chem. (2020) II pp. 1742-1751.
https://www.materia-inc.com/.
https://www.thefirearmblog.com/blog/2016/08/29/future-firearms-ammunition-technology-002-polymer-cased-composite-ammunition-lightening-load-pt-2/.
https://www.thefirearmblog.com/blog/2017/11/24/new-polymer-cased-ammunition-introduced-true-velocity/.
https://ndiastorage.blob.core.usgovcloudapi.net/ndia/2012/armaments/Wednesday13983stoll.pdf.
http://home.swbell.net/sbaughmn/propulsion.html.
https://history.nasa.gov/rogersrep/v2140.htm.
Handling Guide Proxima HPR2029-CT762.
Handling Guide Proxima HPR2128-CT762.
Proxima HPR 2128 Polymer TDS.
Proxima ACR 4100 Polymer TDS.
Proxima HPR 2029 Polymer TDS.
Proxima HPR 2102 Polymer TDS.
Proxima Resins FAQs.
International Preliminary Report on Patentability (IPRP) dated Aug. 31, 2023 issued in counterpart International Application No. PCT/US2022/016108.

* cited by examiner

ROCKET MOTOR

CROSS-REFERENCE TO RELATED APPLICATIONS

The present application claims the benefit under 35 U.S.C. § 371 to International Patent Application No. PCT/US2022/016108, filed on Feb. 11, 2022, which in turn claims the benefit under 35 U.S.C. § 119 to U.S. Provisional Patent Application Ser. No. 63/151,247, filed on Feb. 19, 2021, each of which is herein incorporated by reference.

FIELD

The present disclosure relates to rocket motors and, in particular, solid rocket motors.

BACKGROUND

Solid rocket propellant grains are used in various solid rocket motors. The grain is ignited and generates a combustion zone on the propellant grain surface providing propulsion for the solid rocket motor. Propellant grains are typically cylindrical in shape. The grain may consist of a single cylindrical segment or may contain many segments. There is usually a central core that extends the length of the grain to increase the propellant surface area initially exposed to combustion and it may have a wide variety of cross-sections such as circular, star, cross, dog-bone, wagon-wheel, etc. Propellant grains include end-burning grains. The grains (or grain segments) may be stacked end to end such as in a Ballistic Test and Evaluation System (BATES) grain geometry. The result is that, in addition to the core, each end of each stacked grain (or grain segment) burns, creating more surface area to burn instead of just the ends of a single grain.

Large BATES grain rocket motors 10 are typically bonded to a motor case as shown in FIG. 1A. Each grain 12 has two grain segments assembled by joining each of the two segments and creating field joints 14 as shown in FIGS. 1A and 1B. Field joints 14 require certain assembly requirements and quality assurance to ensure that the joints do not fail when the grains are burning, which can introduce inconsistency and weaknesses into the structure. In addition, field joints can increase the weight of the rocket motor which can negatively impact the performance of the rocket motor.

In view of this, there is a need for improved solid rocket motors.

The background herein is included solely to explain the context of the disclosure. This is not to be taken as an admission that any of the material referred to was published, known, or part of the common general knowledge as of the priority date.

SUMMARY

In accordance with an aspect, a rocket motor comprises: at least two propellant grains; a case comprising the propellant grains, stacked within the case; and a resin for substantially maintaining the grains in position within the case.

In accordance with another aspect, a rocket motor comprises: a propellant grain having at least two propellant grain segments; a case comprising the propellant grain segments, stacked within the case; and a resin for substantially maintaining the grain segments in position within the case.

In accordance with another aspect, a method for making a rocket motor, the method comprising: stacking each of the propellant grains/grain segments in the case such that the fore-end face of one grain/grain segment is spaced from the aft-end face of the adjacent grain/grain segment creating the gap therebetween; injecting a resin into the cavity between the grains/grain segments and the case which substantially maintains the grains/grain segments in position within the case.

In accordance with another aspect, a rocket motor comprises: at least two propellant grains, each having an aft-end face and a fore-end face, wherein at least two of the propellant grains comprise a sleeve having propellant cast therein; and a case comprising the propellant grains, stacked within the case, wherein the sleeve of one propellant grain is coupled to the sleeve of an adjacent propellant grain, the fore-end face of one grain being spaced from the aft-end face of an other grain creating a gap therebetween.

In accordance with another aspect, a rocket motor comprises: a propellant grain having at least two propellant grain segments, each having an aft-end face and a fore-end face, wherein at least two of the propellant grain segments comprise a sleeve having propellant cast therein; and a case comprising the propellant grain segments, stacked within the case, wherein the sleeve of one propellant grain segment is coupled to the sleeve of an adjacent propellant grain segment, the fore-end face of one grain segment being spaced from the aft-end face of an other grain segment creating a gap therebetween.

In accordance with another aspect, a method for making a rocket motor disclosed herein, the method comprising: stacking each of the propellant grains/grain segments in the case such that the fore-end face of one grain/grain segment is spaced from the aft-end face of the adjacent grain/grain segment creating the gap therebetween, wherein the sleeve of one propellant grain is coupled to the sleeve of an adjacent propellant grain/grain segment, the fore-end face of one grain/grain segment being spaced from the aft-end face of an other grain/grain segment creating the gap therebetween.

In accordance with another aspect, a rocket comprising the rocket motor disclosed herein.

It is understood that one or more of the aspects described herein (and above) may be combined in any suitable manner. The novel features described in this disclosure will become apparent to those of skill in the art upon examination of the following detailed description. It should be understood, however, that the detailed description and the specific examples presented, while indicating certain aspects, are provided for illustration purposes only because various changes and modifications will become apparent to those of skill in the art from the detailed description and claims that follow.

BRIEF DESCRIPTION OF THE DRAWINGS

Embodiments are described in detail below with reference to the Figures, wherein.

DETAILED DESCRIPTION OF CERTAIN EMBODIMENTS

Definitions

Figure 1A:
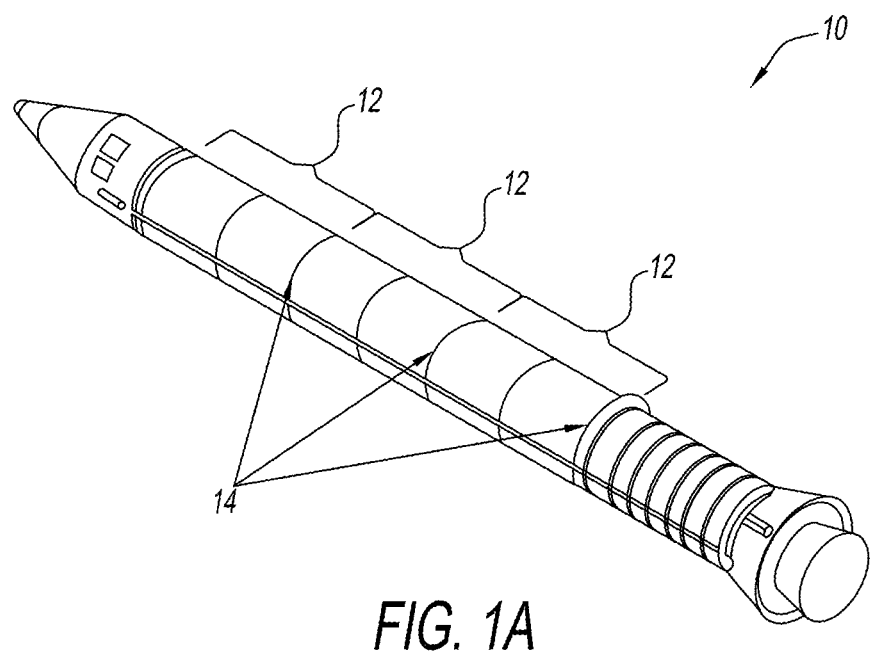
FIG. 1A shows a Prior Art isometric view of a typical BATES grain rocket motor.
Figure 1B:
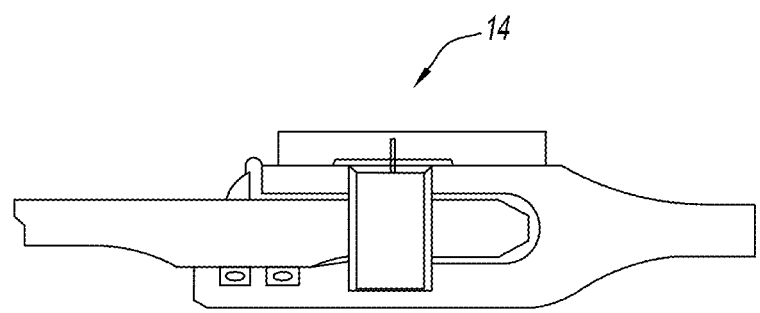
FIG. 1B shows a Prior Art cross sectional view of a typical BATES grain field joint.

Unless otherwise explained, all technical and scientific terms used herein have the same meaning as commonly understood by one of ordinary skill in the art to which this disclosure belongs. Although any processes and materials similar or equivalent to those described herein can be used in the practice for testing of the present invention, the typical materials and processes are described herein. In describing and claiming the present invention, the following terminology will be used.

It is also to be understood that the terminology used herein is for the purpose of describing particular aspects only and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like. Typically, a composition consisting essentially of a set of components will comprise less than 5% by weight, typically less than 3% by weight, more typically less than 1%, and even more typically less than 0.1% by weight of non-specified component(s).

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

As used herein, "BATES grain rocket motor" refers to a type of solid-fuel rocket motor grain geometry. Typically, a BATES grain comprises two or more grain segments with the outer surface typically inhibited, but free to burn both on the segment ends and the core. The burn may be progressive, regressive or neutral.

The configuration of propellant grains determines its mass burn rate as a function of time over the period of its burning. The amount of propellant gas being produced, and the resulting pressure in a rocket motor is a function of mass burn rate. The mass burn rate can increase, remain approximately constant, or decrease as the propellant burns and the thrust of a rocket motor will also increase, remain approximately constant, or decrease as the propellant grain burns. These types of propellant grain burning are described as progressive, neutral, and regressive, respectively. Progressive burning is understood to mean that the reacting surface area increases during the interval of combustion; the mass burn rate increases over time. An example of a configuration that exhibits progressive burning is a case-bonded grain with a cylindrical core. As burning proceeds, the diameter of the core increases, causing the burning surface area to increase, resulting in increased gas production and thrust. Neutral burning is understood to mean that the reacting surface area remains approximately constant during the interval of combustion; the mass burn rate remains approximately constant over time. Many propellant grain geometries can be configured to approximate neutral burning. Regressive burning is understood to mean that the reacting surface area decreases during the interval of combustion; the mass burn rate decreases over time. A regressive-burning grain shape is such that the total amount of burning surface area decreases as burning continues (K. Kosanke, Terminology of Model Rocketry Explained, Issue 321, Apogee Components, Inc., Sep. 11, 2012).

The term "resin" is understood to include any suitable resin. It is also understood to include a resin blend comprising two or more resins. The resin can be any suitable synthetic resin, which includes thermosetting resins and thermoplastic resins. Such resins are normally in liquid state or are soluble or fusible and after being subjected to, for example, a chemical change caused by heating, catalyzing or other (e.g. photochemical reaction or the like), can be cross-linked to form a solid. Suitable resins include, for example, epoxy resin(s), unsaturated polyester resin(s), phenolic resin(s), carbamate ester resin(s) (e.g. urethane), amino resin(s), alkyd resin(s), silicone resin(s), or a combination thereof. Such resins can be enhanced by using a blend. In examples, resins such as epoxy resins, can be enhanced by mixing liquid carboxyl-terminated butadiene-acrylonitrile (CTBN) with epoxy resin prepolymers and then curing the resulting mixture under particular conditions. In addition to CTBN, other carboxyl-terminated rubbers (carboxyl-terminated polybutadiene (CTB), carboxyl-terminated styrene-butadiene rubber (CTBS), carboxyl-terminated polyether rubber (CTPE) or the like) and various hydroxy-terminated rubbers (liquid hydroxy-terminated nitrile rubber (HTBN), hydroxy-terminated polybutadiene (HTPB) or the like) can be used in blends. When the term "resin" is used in the rocket motor, it is understood to be in a physical form for coupling and, for example, substantially maintaining the position of the grains. When the term "resin" is used in the method, it is understood to be flowable prior to, for example, curing, and once the method is completed, it is in a physical form for coupling and, for example, substantially maintaining the position of the grains.

Certain Embodiments of Rocket Motors

Generally, a rocket motor comprises one or more propellant grains. In certain embodiments, each propellant grain can have one or more grain segments.

With respect to the following rocket motors disclosed herein, although the embodiments are directed to Bates grain(s), these rocket motors are also applicable to any rocket motors that utilize i) two or more propellant grains or ii) a propellant grain having two or more grain segments. If there are two or more propellant grains, each grain may be whole or have more than one segment.

In an embodiment, a rocket motor comprises at least two propellant grains; a case comprising the propellant grains, stacked within the case; and a resin for substantially maintaining the grains in position within the case.

In another embodiment, a rocket motor comprises a propellant grain having at least two propellant grain segments; a case comprising the propellant grain segments, stacked within the case; and a resin for substantially maintaining the grain segments in position within the case.

In another embodiment, a rocket motor comprises at least two propellant grains, each having an aft-end face and a fore-end face. At least two of the propellant grains comprise a sleeve having propellant cast therein. The motor further comprises a case comprising the propellant grains, stacked within the case, wherein the sleeve of one propellant grain is coupled to the sleeve of an adjacent propellant grain such that the fore-end face of one grain is spaced from the aft-end face of an other grain creating a gap therebetween.

In another embodiment, a rocket motor comprises a propellant grain having at least two propellant grain segments, each having an aft-end face and a fore-end face. At least two of the propellant grain segments comprise a sleeve having propellant cast therein. The motor further comprises a case comprising the propellant grain segments, stacked within the case, wherein the sleeve of one propellant grain segment is coupled to the sleeve of an adjacent propellant grain segment such that the fore-end face of one grain segment is spaced from the aft-end face of an other grain segment creating a gap therebetween.

Figure 2:
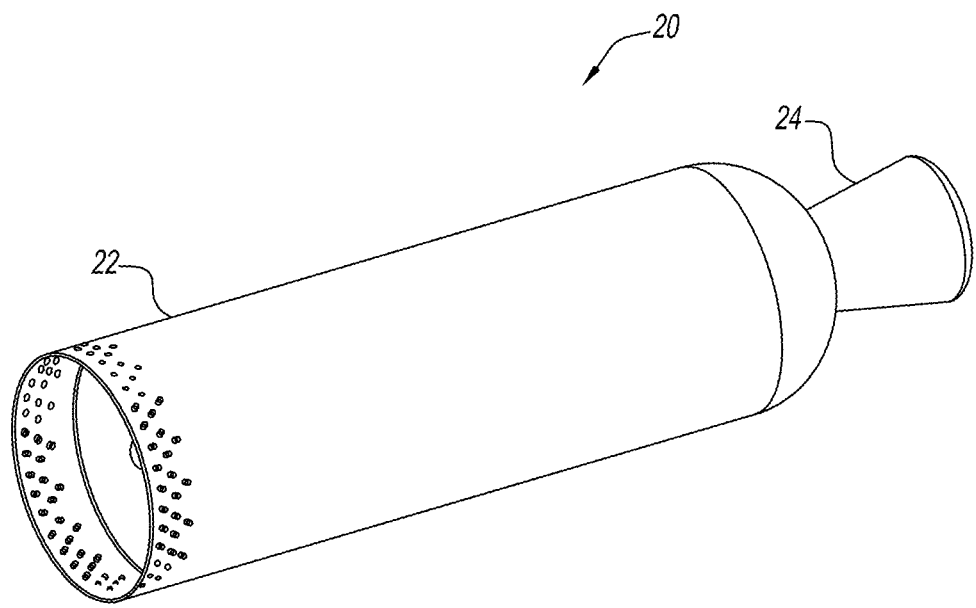
FIG. 2 shows an isometric view of an exemplary BATES grain rocket motor with a casing.
Figure 3:
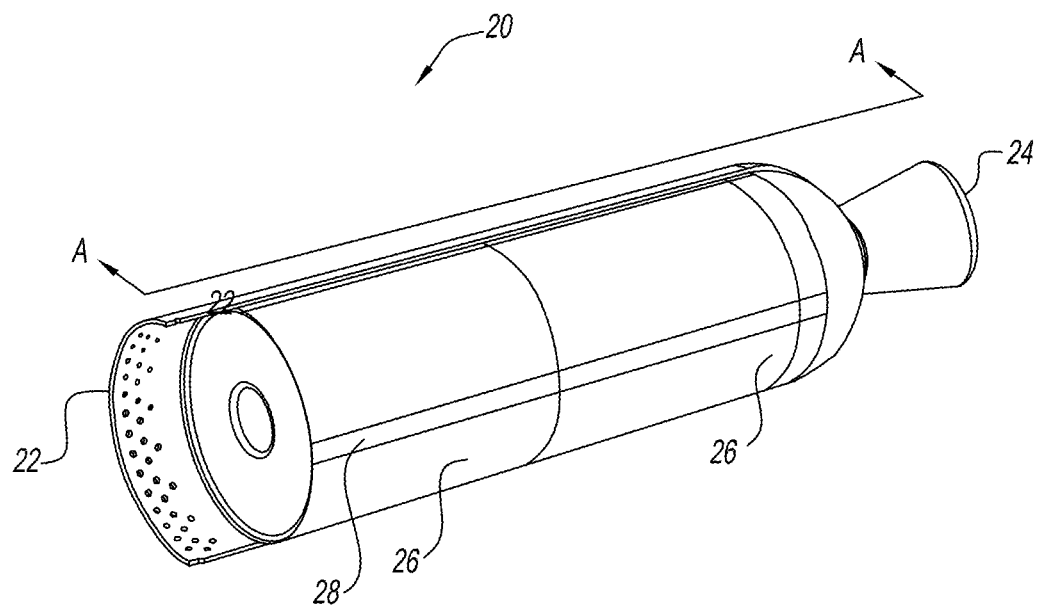
FIG. 3 shows an isometric view of the BATES grain rocket motor of FIG. 2 with a portion of the casing removed.

Turning now to FIG. 2, an exemplary BATES grain rocket motor 20 is shown. The rocket motor 20 has a case 22 and a nozzle 24 at an aft end of the case 22. FIG. 3 shows the rocket motor of FIG. 2 with a portion of the case 22 cut away. The case 22 is substantially cylindrical and has an interior channel. Therewithin the channel are stacked and aligned BATES grain segments 26. While FIG. 3 shows two BATES grain segments 26, it is understood that any number of BATES grains/grain segments may be used. The BATES grain segments 26 are substantially cylindrical in shape. Around the outer circumference of the BATES grain segments 26 are a plurality of spacers 28 (which may be removed prior to use) between the BATES grain segments 26 and the case 22.

Figure 4A:
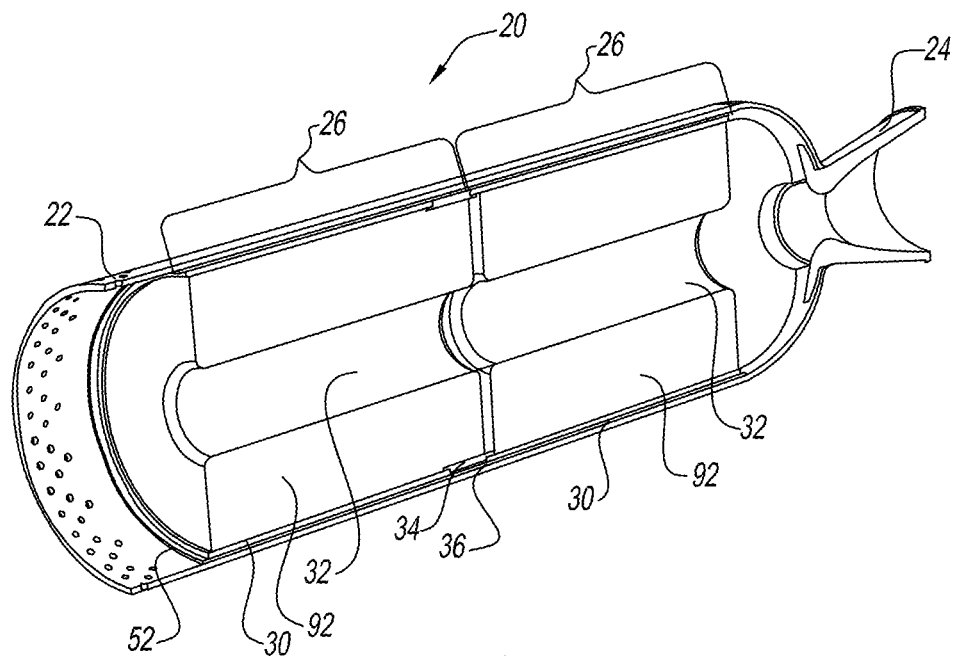
FIG. 4A shows a cross-sectional isometric view of the BATES grain rocket motor along the A-A line in FIG. 3.

FIG. 4A shows a cross-sectional isometric view of the rocket motor 20 along the A-A line in FIG. 3. Each BATES grain segment 26 comprises propellant 92 including a bore 32 therethrough, which is surrounded by an inhibitor liner 30, and then sleeve 52. One liner 30 has a connector 34 (e.g. the connector 34 can be integral with the liner 30 or coupled to the liner 30) at its aft-end portion and the second liner 30 has a corresponding connector 36 (e.g. the connector 36 can be integral with the liner 30 or coupled to the liner 30) at its fore-end portion. The connector 34 is coupled to the corresponding connector 36 at one end of the next BATES grain, aligning the BATES grain segments 26 within the rocket motor 20 such that a fore-end face of one grain 26 is spaced from an aft-end face of an other grain 26 creating a gap therebetween. Typically, the coupling allows a hermetic seal to form around the gap between the BATES grain segments 26. The connectors 34 and 36 of the BATES grain segments 26 may be any suitable connection fit such as tongue and groove, socket and spigot, lap joints, butt joints, and the like.

Figure 4B:
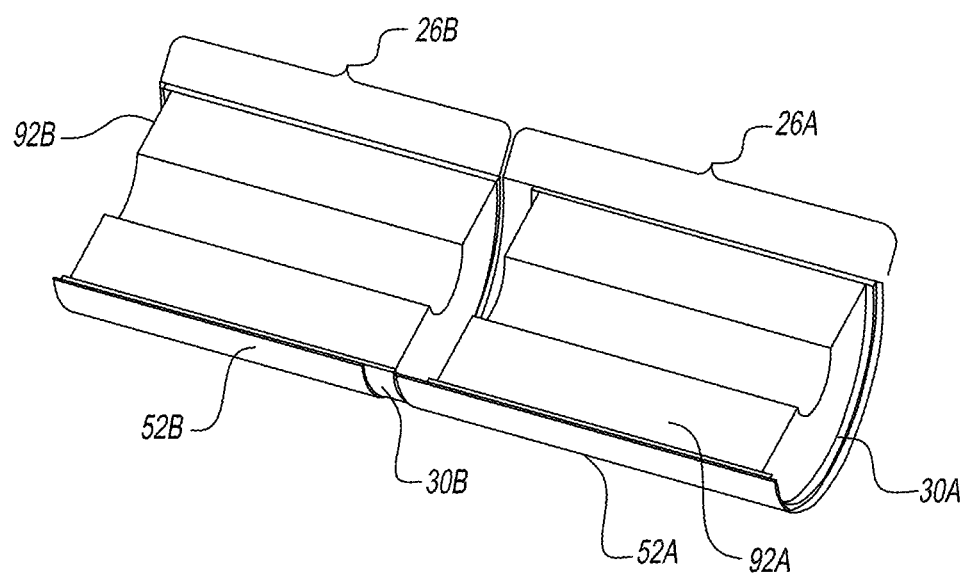
FIG. 4B shows a cross-sectional isometric view of an alternative embodiment for stacking the BATES grains.

FIG. 4B shows a cross-sectional view of an alternative embodiment for stacking the BATES grains 26A and 26B. BATES grains 26A and 26B comprise propellant 92A and 92B, respectively, and each are surrounded by an inhibitor liner 30A and 30B, respectively, and then sleeves 52A and 52B, respectively. In this embodiment, the sleeve 52A of BATES grain 26A is longer at its fore-end portion. The sleeve 52B of BATES grain 26B is shorter at its aft-end portion, such that the liner 30B is exposed. When stacked, the fore-end portion of the sleeve 52A abuts the aft-end portion of the sleeve 52B, covering the exposed liner 30B of BATES grain 26B. This abutment allows a hermetic seal to form around the gap between the BATES grain segments 26A and 26B.

It is understood that there term "sleeve" and "liner" can be used interchangeably. In embodiments, the sleeve may function as both a sleeve and a liner such that a separate liner is not required. The grains can be coupled solely through the sleeves, or solely through the liners, or through both.

Figure 5:
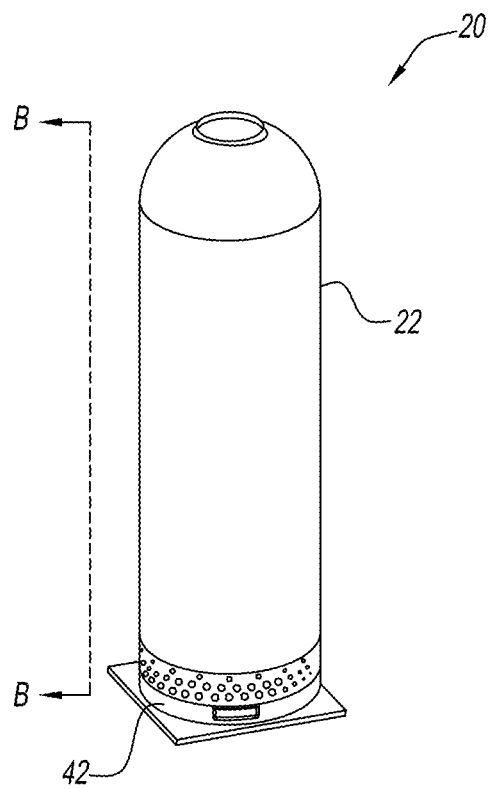
FIG. 5 shows an isometric view of the BATES grain of FIG. 2 including a plug.
Figure 7:
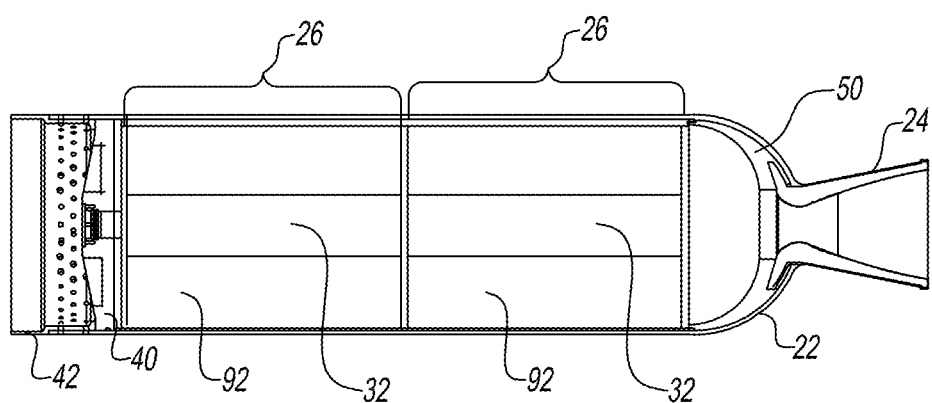
FIG. 7 shows a cross-sectional side view of the BATES grain of FIG. 5 including the nozzle along the B-B line.
Figure 6:
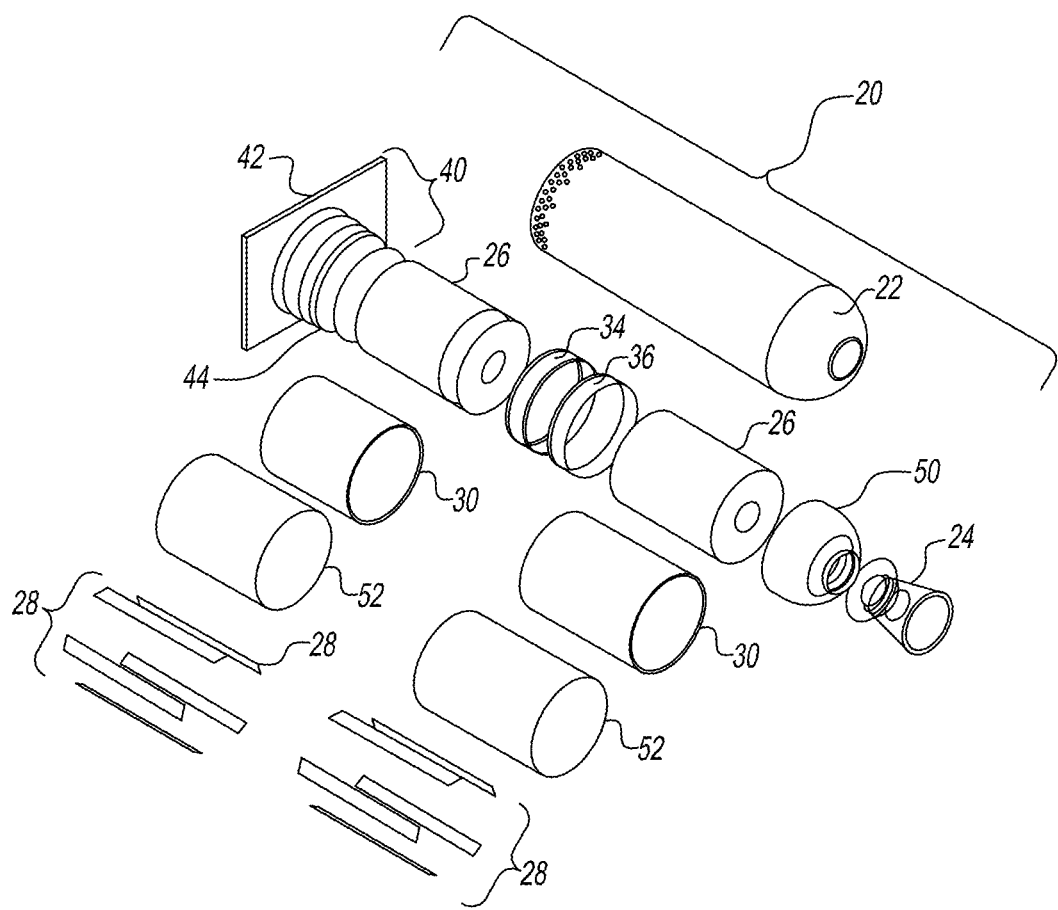
FIG. 6 shows an exploded view of the BATES grain of FIG. 5.

FIG. 5 shows an isometric view of the rocket motor 20 with a base 42. Base 42 holds a plug 40 (shown in FIG. 6). FIG. 6 shows an exploded view of the rocket motor 20, which shows the plug 40 (shown in more detail in FIGS. 18 and 19), the sleeve 52, and the end cap 50. FIG. 7 shows a cross-sectional view of the rocket motor 20 along the B-B line in FIG. 5.

Certain Embodiments of Rocket Motor Manufacturing

In an embodiment, a method for making a rocket motor described and claimed herein comprises stacking each of the propellant grains/grain segments in the case such that the fore-end face of one grain/grain segment is spaced from the aft-end face of the adjacent grain/grain segment creating the gap therebetween. The sleeve of one propellant grain is coupled to the sleeve of an adjacent propellant grain, the fore-end face of one grain being spaced from the aft-end face of an other grain creating the gap therebetween.

In another embodiment, a method for making a rocket motor comprises stacking each of the propellant grains/grain segments in the case such that the fore-end face of one grain/grain segment is spaced from the aft-end face of the adjacent grain/grain segment creating the gap therebetween. A resin is injected into the cavity between the grains/grain segments and the case. The resin substantially maintains the grains/grain segments in position within the case.

Figure 8:
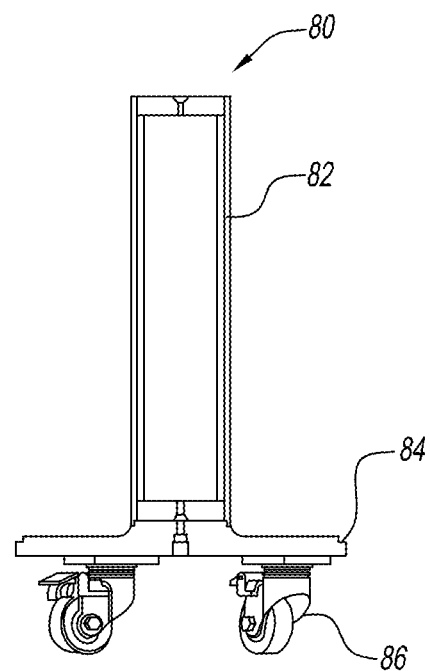
FIG. 8 shows a side view of an exemplary casting mandrel.
Figure 9:
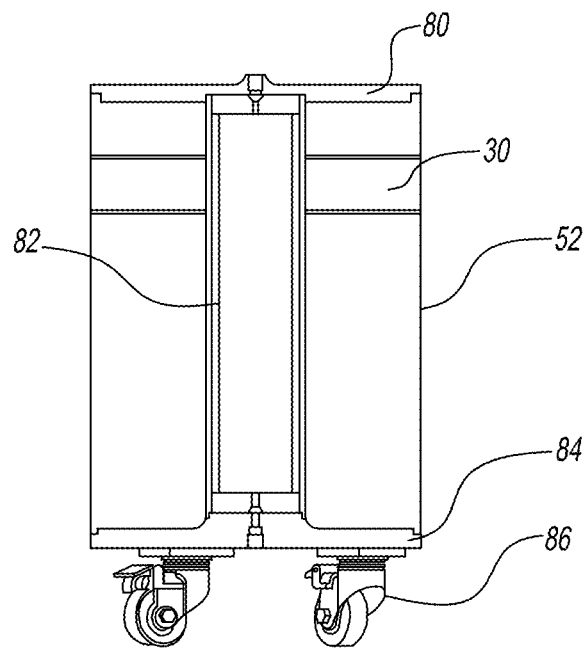
FIG. 9 shows a cross-sectional side view of the casting mandrel of FIG. 8 including a sleeve and top plate.
Figure 10:
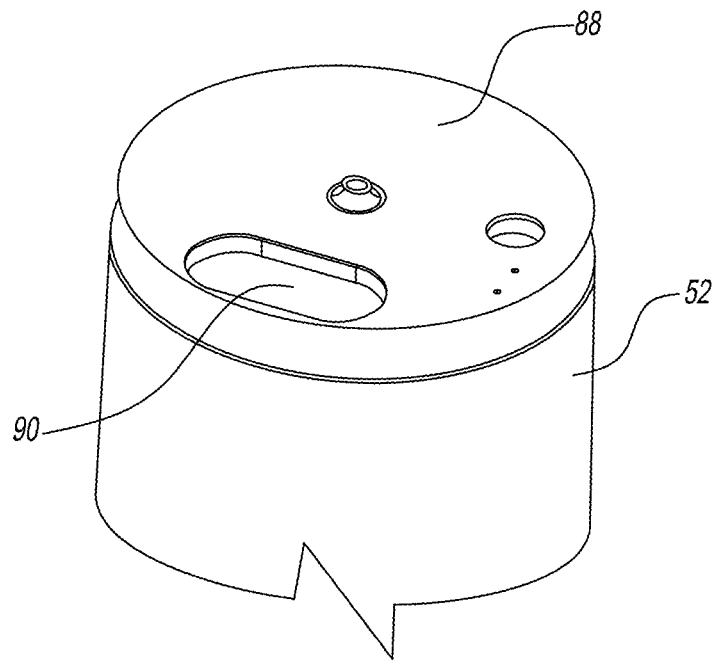
FIG. 10 shows an isometric view of the top plate of the casting mandrel of FIG. 8 including the sleeve.

FIG. 8 shows an exemplary casting mandrel 80 for making a propellant grain such as BATES grain 26. The casting mandrel 80, typically composed of metal, metal alloy, or composites, has a substantially cylindrical center bore tube 82 or post atop a bottom plate 84. The bottom plate 84 may have casters 86 attached to facilitate moving the cast BATES grain 26. FIG. 9 shows the sleeve 52 surrounding the liner 30, which is placed around the bore tube 82 on the bottom plate 84. A top plate 88 is placed on top of the sleeve 52 and bore tube 82. The top plate 88 may be screwed on or friction fitted or any other method of fastening the top plate to the liner and bore tube. The mandrel 80 with the bore tube 82, bottom plate 84, sleeve 52, and top plate 88 form a casting mold for a BATES grain 26. In another embodiment, a core of the propellant grain segments is modular, and may be of any desired length. FIG. 10 shows an isometric close-up view of the top plate 88. The top plate has an opening 90 into which the propellant 92 is introduced into the casting mold. The propellant 92 may be introduced by hose, funnel or any other method of introducing the propellant 92. The propellant 92 may be a slurry, paste, molten or any other form that allows for the propellant to be molded and cured.

Figure 11:
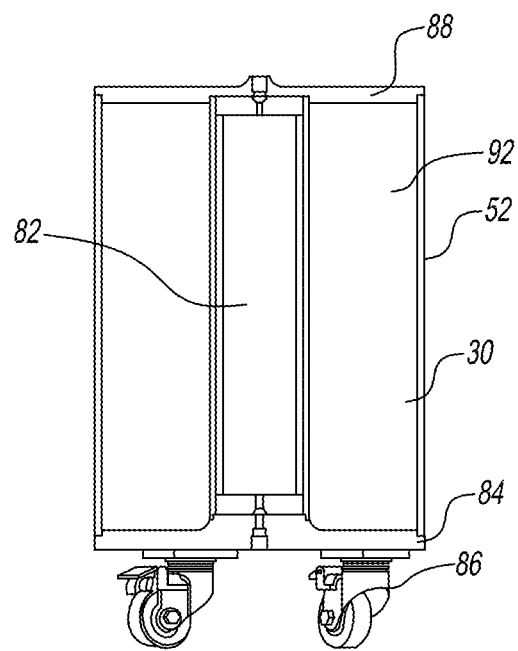
FIG. 11 shows a cross-sectional view of the BATES grain within the casting mandrel of FIG. 8.
Figure 12:
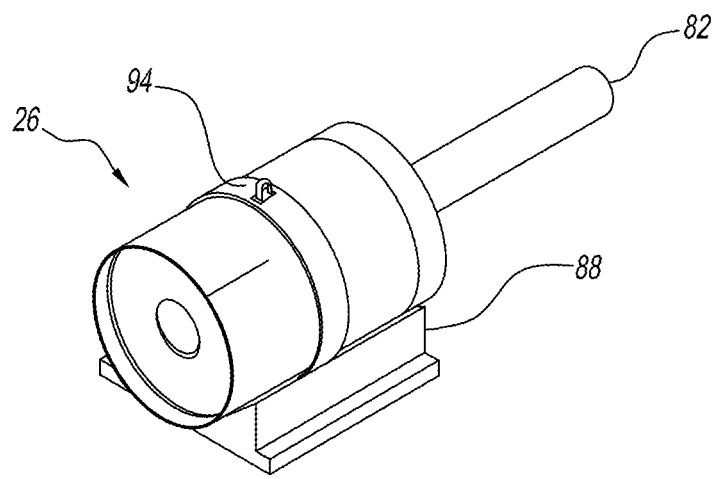
FIG. 12 shows an isometric view of the exemplary finished BATES grain from the casting mandrel of FIG. 8.
Figure 13:
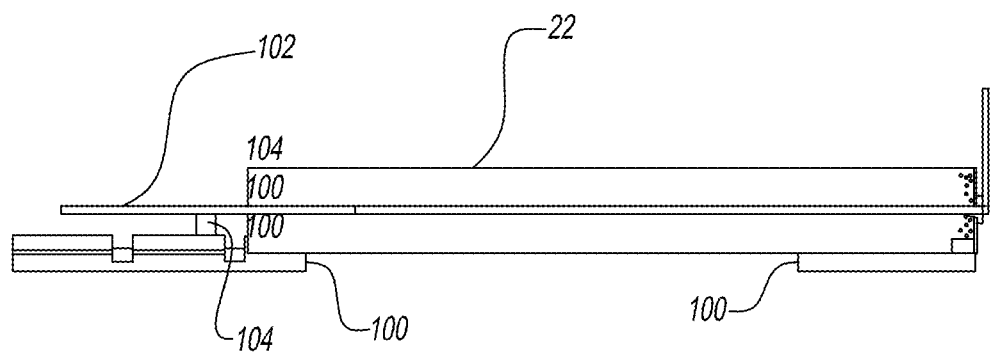
FIG. 13 shows an exemplary assembly for inserting BATES grains into a rocket motor case.

Once the propellant 92 has been introduced, as shown in FIG. 11, the propellant 92 is allowed to cure to form the BATES grain 26. FIG. 12 shows the BATES grain 26 once it has been cured. A hoist collar 94 may be attached to the sleeve 52 to allow for the BATES grain to be lifted. The bottom plate 84 and top plate 88 are removed from the BATES grain 26. FIG. 12 shows the BATES grain sitting in a chock 96 to facilitate the removal of the top plate 88 and bottom plate 84. FIG. 12 further shows the bore tube 82 being removed from the BATES grain bore.

While FIGS. 8 to 12 show an exemplary method of casting a BATES grain, it is understood that other methods and steps may be taken to make propellant grains.

FIGS. 13 to 16 shows an exemplary system for inserting propellant grains, such as BATES grains, into a case to assemble the rocket motor 20. The case 22 may be prepared by placing it on chocks 100 to facilitate insertion of the BATES grains. A base plate is installed at one end of the case 22. Spacers 28 are placed within the case (shown in FIG. 3 or FIG. 6) to help center the grain. A rod 102 (e.g. threaded), supported by support blocks 104 is inserted into the case.

Figure 14:
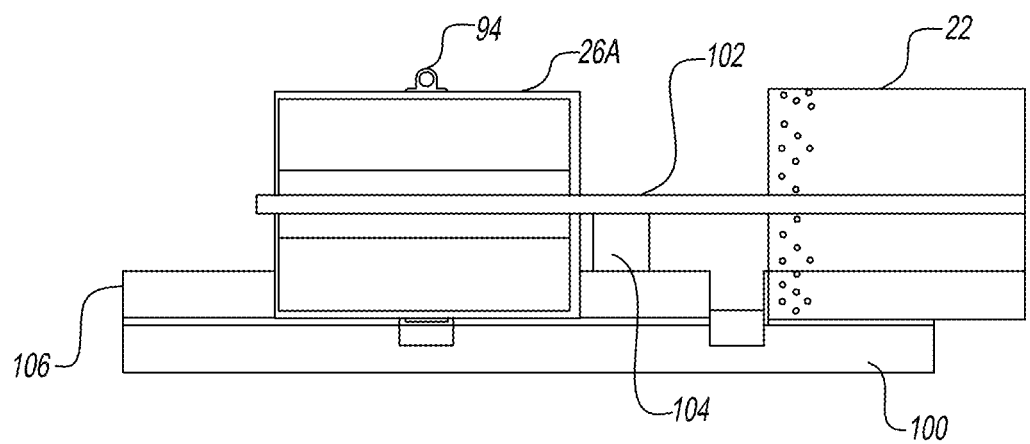
FIG. 14 shows an exemplary first BATES grain being prepared for insertion into a rocket motor case using the assembly of FIG. 13.

As shown in FIG. 14, using a crane or other suitable means of hoisting, the BATES grain 26A may be placed on an insertion chock 106, with the rod 102 through the center bore 32 of the BATES grain 26A.

Figure 15:
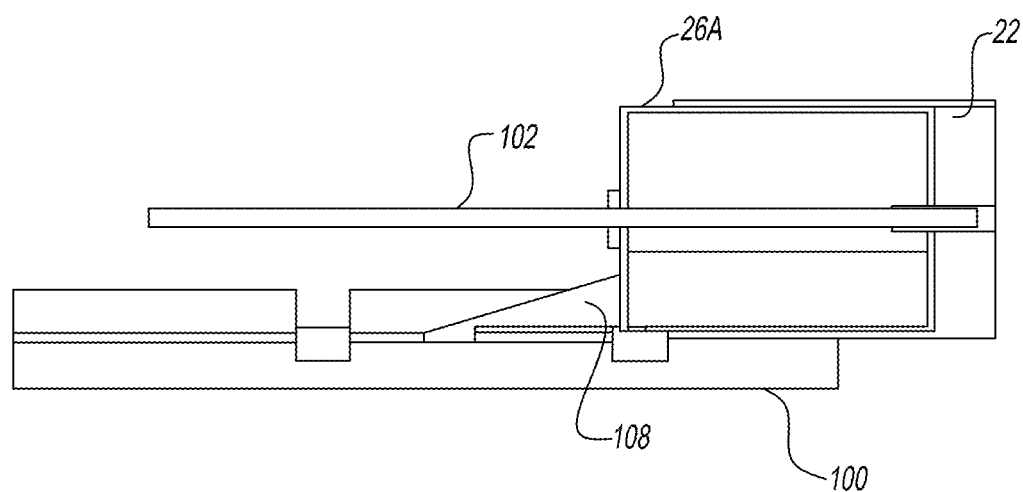
FIG. 15 shows the exemplary first BATES grain shown in FIG. 14 being inserted into a rocket motor case using the assembly of FIG. 13.

In FIG. 15, the hoist collar 94 (shown in FIG. 14) has been removed and a push plate 108 is threaded onto the rod 102 such that it abuts and pushes against the end of the BATES grain 26A. The rod support blocks 104 may be removed. The BATES grain may be drawn into the case 22 by turning the rod which may be attached to a ratchet handle (not shown) at the opposite end of the case 22, causing the push plate 108 to push the BATES grain 26 into the case 22 as it is being threaded. The BATES grain 26A is stopped just before the connector 36 of the BATES grain 26A enters the case 22.

The rod 102 is reversed, thereby moving the push plate 108 back off the BATES grain 26A until the push plate 108 may be removed from the rod. The next BATES grain 26B may be placed on the rod 102 and the process of FIGS. 14 and 15 is repeated.

Figure 16:
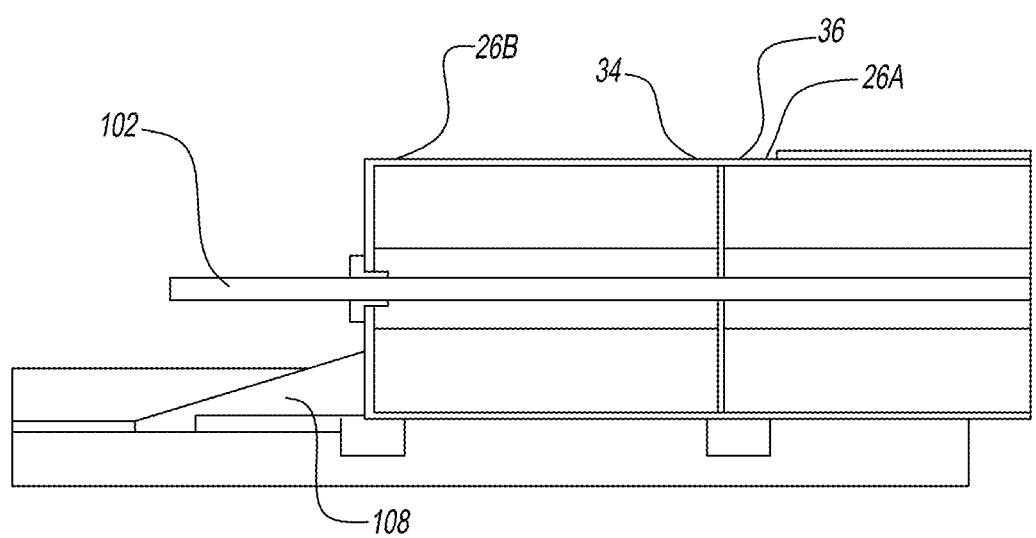
FIG. 16 shows an exemplary second BATES grain being inserted into a rocket motor case using the assembly of FIG. 13.

FIG. 16 shows the second BATES grains 26B moved into position to abut the first BATES grain 26A, such that the connector 36 of the first BATES grain 26A couples with the connector 34 of the second BATES grain 26B. In embodiments, adhesive may be applied to the respective connectors before mating to seal the joint. The rod 102 is then turned to draw in the first and second BATES grains 26A and 26B until just before the connector 36 of the BATES grain 26B enters the case 22. The rod 102 is reversed, thereby moving the push plate 108 back off the BATES grain 26A until the push plate 108 may be removed from the rod. The next BATES grain (not shown) may be placed on the rod 102 and the process of FIGS. 14, 15, and 16 are repeated until the case 22 is filled. While FIGS. 13 to 16 show exemplary steps to inserting the BATES grains 26 into a case 22, it is understood that other methods may be taken to insert the grains.

Figure 17:
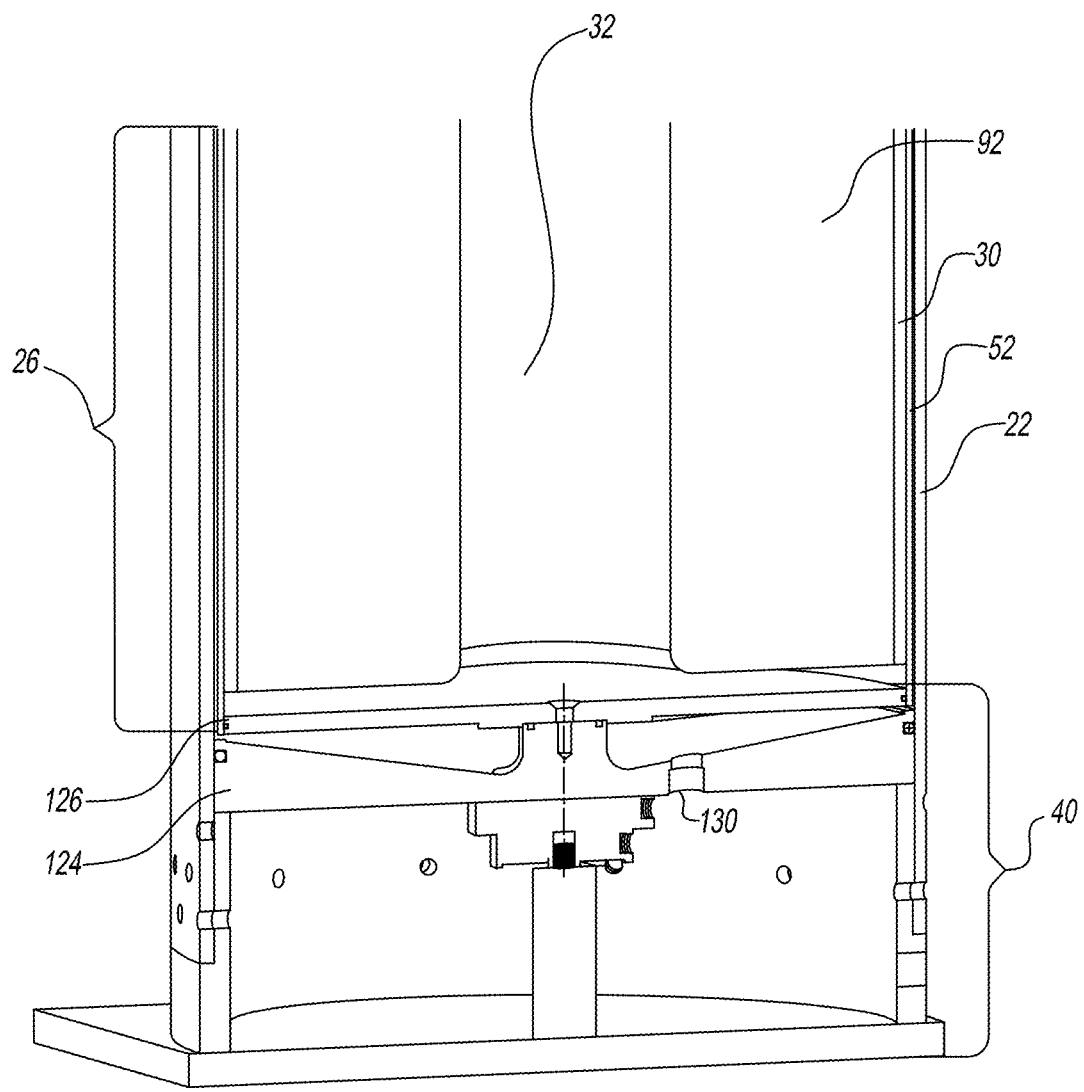
FIG. 17 shows a sectional view of an exemplary bottom of the rocket motor including an exemplary plug.
Figure 18:
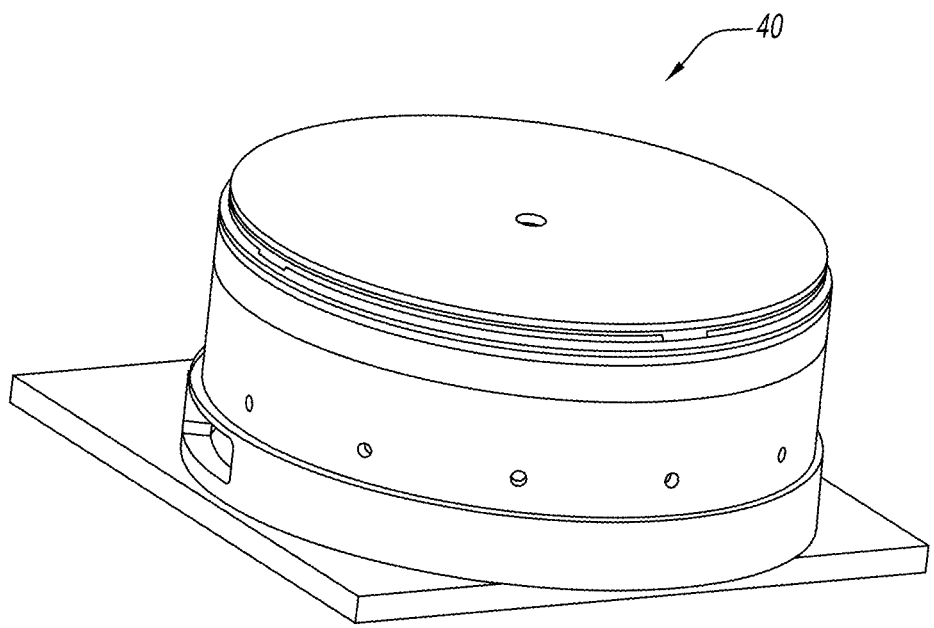
FIG. 18 shows an isometric view of the plug and base of FIG. 17.
Figure 19:
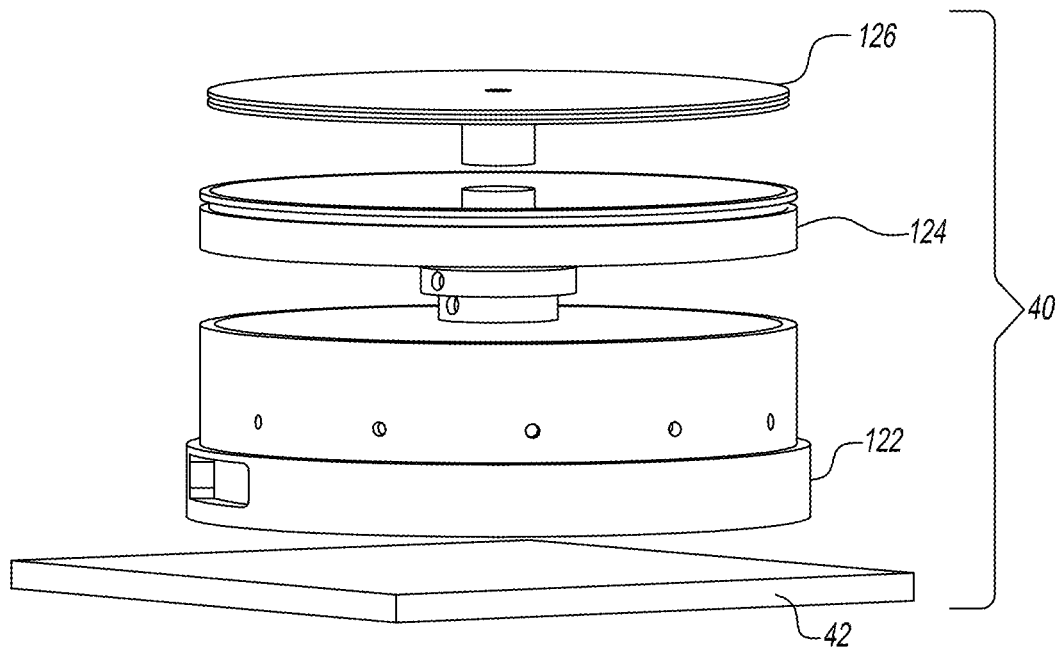
FIG. 19 shows an exploded view of the plug of FIG. 18.

Once all the grains have been inserted, a plug 40 is inserted into the bottom of the case 22. FIG. 17 shows a close-up sectional view of the bottom of the case with the plug 40. FIG. 18 shows the plug 40 in more detail. FIG. 19 shows an exploded view of the plug 40. In this embodiment, the plug 40 comprises a base plate 42, a pump plug 122, push plates 124 and 126. Using this plug 40, a resin such as an epoxy resin, including hydroxyl-terminated polybutadiene (HTPB), or other suitable resin, is pumped into the case to fill the space 120 between the BATES grains 26A and 26B and the inside wall of the case 22, created by the spacers 28, which can assist in centering the grains. The epoxy resin, once cured, bonds the BATES grains 26 to the case 22 which can substantially maintain the grains in position. In an embodiment, after the resin is at least partially cured, the spacers 28 can be removed and the plug 40 removed. With respect to the resin, any suitable resin may be used herein.

Figure 20:
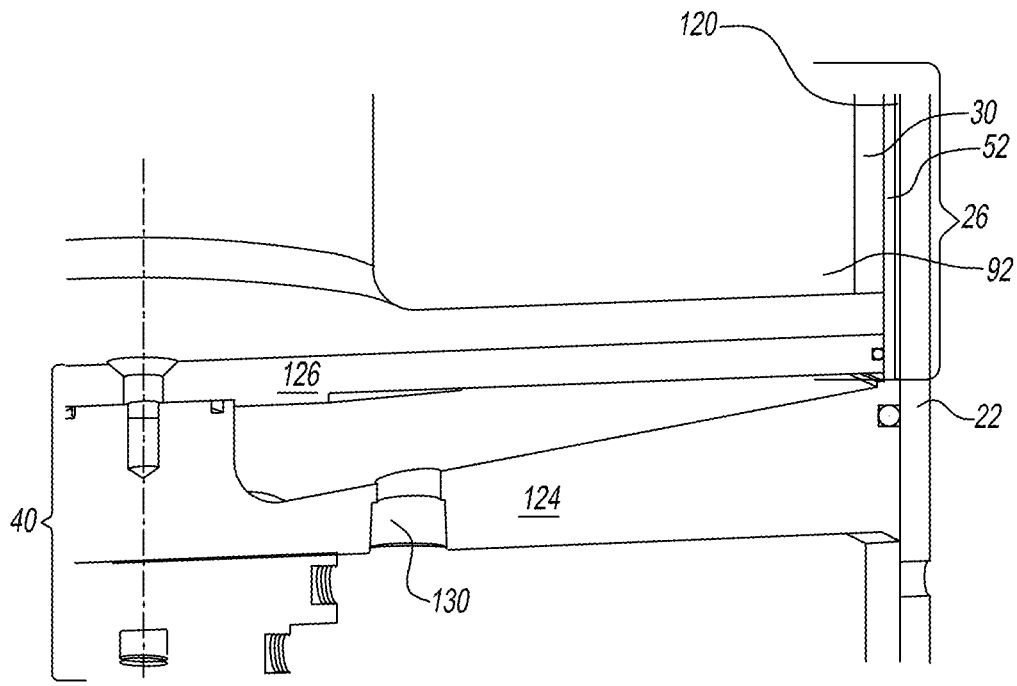
FIG. 20 shows a close-up view of one side of the plug before resin is being injected into the rocket motor.

FIG. 20 shows one side of the plug 40 before the resin is injected. In FIG. 20, the plug abuts the bottom of the sleeve 52, sealing it from allowing any resin to flow into the case.

Figure 21:
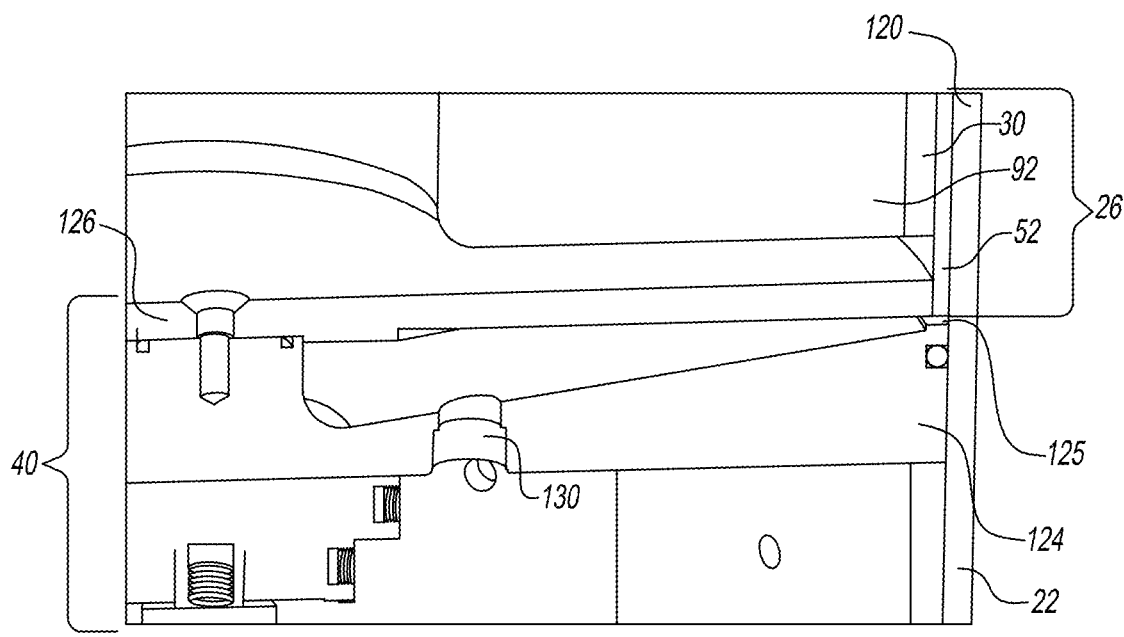
FIG. 21 shows a close-up view of the plug as resin is being injected into the rocket motor.

FIG. 21 shows the plug as the resin is being injected. As the resin fills the plug through opening 130, the push plates 124 and 126 are pushed apart, creating an opening 125 to the cavity 120. As the resin continues to fill the plug, resin is forced into the cavity 120 between the sleeves 52 of the grains 26 and the case created by the spacers 28. When the cavity 120 has filled, and the resin is allowed to cure (at least partially), the plug 40 is removed. In various embodiments, an operator can stop the injection of resin upon visual inspection of vent ports in or spillage from the operating equipment. Alternatively, pressure sensor(s) can be used to sense the pressure difference so that injection of the resin can be stopped once the cavity 120 is filled. In another embodiment, the injections of the resin may be stopped by a combination of visual inspection and pressure sensing.

Figure 22:
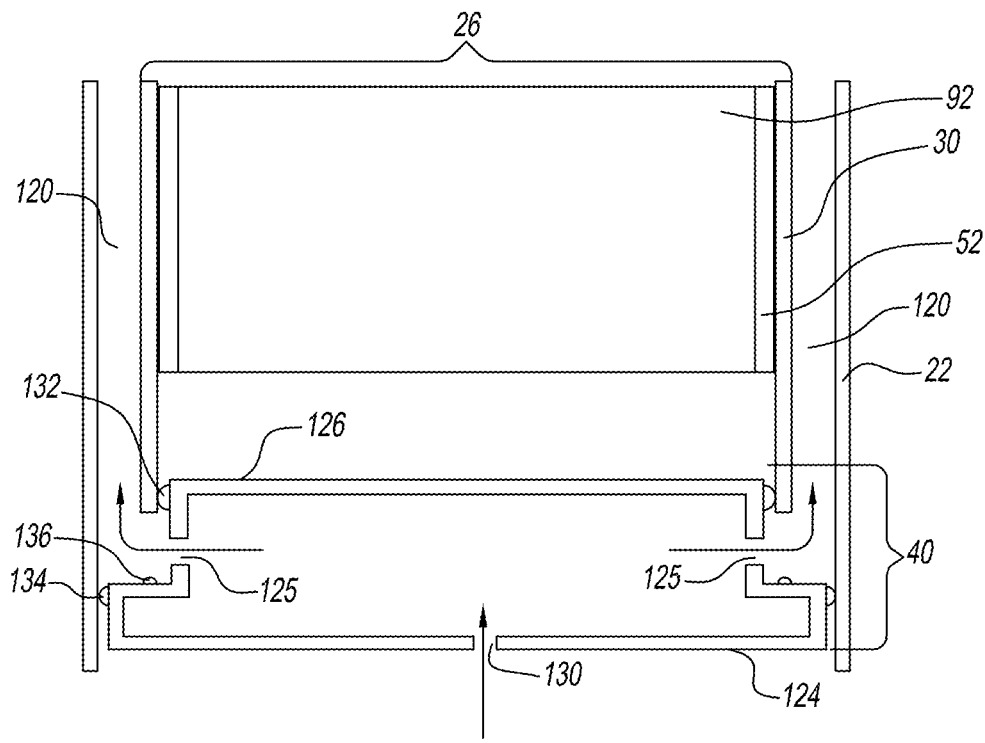
FIG. 22 shows an alternative embodiment to FIG. 21 of the plug as resin is about to be injected into the rocket motor.
Figure 23:
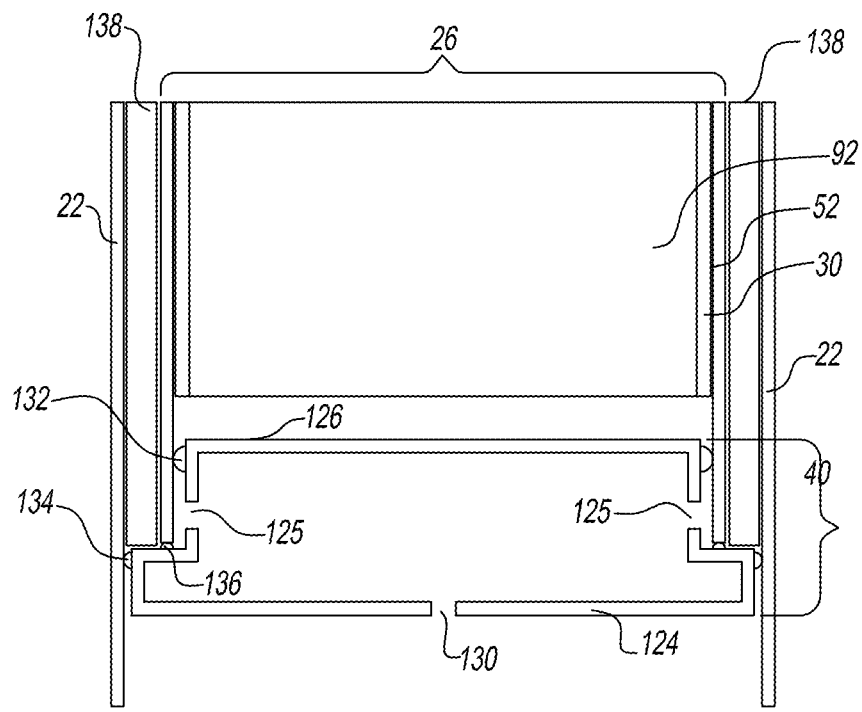
FIG. 23 shows the embodiment of FIG. 22 once the resin has been injected.

FIGS. 22 and 23 show an alternative embodiment to FIGS. 20 and 21. In the embodiment of FIG. 22, resin is injected into the plug 40 (showing only plates 124 and 126) through opening 130, and from there, into the cavity 120 as indicated by the arrows. The push plates 124 and 126 are pushed apart due to the resin filling the plug 40, creating an opening 125 to the cavity 120. A seal 132 on push plate 126, which abuts the interior of sleeve 52, can prevent resin from flowing into the sleeve 52 where the liner 30 and propellant 92 sit. Seal 132 may sit in a groove (not shown) on the wall of push plate 126. A seal 134 on push plate 124, which abuts the interior of the case 22, can prevent resin from flowing out of the case 22. Seal 134 may sit in a groove (not shown) on the wall of push plate 124. In FIG. 23, once the cavity 120 has been filled with an appropriate amount of resin 138, the injection through the plug 40 is stopped and the resin 138 is allowed to cure. When the injection through the plug 40 has stopped, push plates 124 and 126 return to their original positions. In this position, seal 136 on push plate 124 abuts the bottom of the sleeve 52, preventing any further flow into the cavity 120. Seal 136 may sit in a groove (not shown) on the wall of push plate 124. Seals 132, 134, 136, may be made from any suitable material that can function as a seal in rockets. Examples include, without being limited thereto, silicone, viton, and/or any suitable polymeric material (e.g. heat/chemical resistant elastomers).

With respect to the case and nozzle, any suitable rocket nozzles (e.g. De laval nozzles) and cases (e.g. made from any material that can withstand burning propellant, which includes any flame retardant material such as high performance materials including carbon fibres, Kevlar fibres, acrylonitrile butadiene rubber (NBR) or silicone based fire retardant) may be used. The rocket motor case has a head-end dome that contains an igniter and an aft-end dome that houses or supports the nozzle. Particularly lightweight components are often made by filament winding of high-strength fibres on a suitable form. The filaments can be held in place by continuous application and curing of plastic during winding. In motor cases, the front and aft domes can be wound as integral parts of the case, with suitable openings and fixtures included to permit removal of the (collapsible) motor case form, loading of propellant, and attachment of igniter and nozzle.

With respect to the spacers 28, may be any number of spacers, shapes and suitable material to substantially maintain a cavity between the grain(s) and the casing. The spacers, for example, can be made from any material that has a low coefficient of friction such as polytetrafluoropolymers, which can be removed after insertion (e.g. Teflon, glass, Kevlar, polymer based carbon fibre, epoxy matrix, etc.). The spacers may also remain as part of the rocket motor. Such materials may be infusible materials, composite materials, and/or refractive materials, such as carbon polymer materials. Spacers are placed to create the cavity between the grains and the case. Spacers may be separate from and/or integral with the case. Spacers may be separate from and/or integral with at least one grain. Spacers may be separate from and/or integral with at least one sleeve of at least one grain. Spacers may be longitudinal spacers (e.g. FIG. 6) and/or latitudinal spacers (e.g. rings, disks, etc.). If resin used, latitudinal spacers may be porous and/or include holes to permit the resin to pass therethrough.

With respect to the liner 30, the liner can be any suitable combustion inhibitor material for propellant grains. For example, bonding non-propellant material to restrict the burning surface of a propellant grain. In some embodiments, liner comprises at least one of an epoxy, epoxy matrix, polymer (e.g. rayon) based carbon fibres, glass, Kevlar, a urethane, a cyanoacrylate, a fluoroelastomer, mica, and graphite, such as the materials described in U.S. Pat. Nos. 7,565,930, 7,950,457 and 8,186,435. Other examples include EPDM, fiberglass, impregnated composite materials, or any number of materials which protects the combustion chamber while the motor is burning.

With respect to the sleeve 52 and the end cap 50, can be made from any suitable material. Typically, the material is insulation material, for example, EPDM (Ethylene Propylene Diene Monomer), fiberglass, impregnated composite materials, or any number of materials which protects the combustion chamber while the motor is burning. Ablative composite material can dissipate a large amount of heat in a short period of time with sacrificial loss of material. Ablative composites are polymeric composites where the reinforcement is generally a fibre with high melting point like carbon or silica and the matrix is a high char yielding resin like phenolics.

It is understood that there term "sleeve" and "liner" can be used interchangeably. In embodiments, the sleeve may function as both a sleeve and a liner such that a separate liner is not required. Suitable material(s) can be used accordingly. The sleeve/liner can be a coating if not being used as a coupler to another sleeve/liner.

With respect to the plug 40, any suitable member that can function to permit the flow of resin through the plug and into the case. For example, the push plates 126 and 124 of plug 40 may be any suitable seal, stopper, cap, or the like.

The propellant grain(s) disclosed herein comprises a propellant and any conventional rocket propellant may be used herein. Typically, propellant grain(s) are cylindrical in shape to fit into a rocket. The grain may consist of a single cylindrical segment or may contain many segments. A central core that extends the length of the grain may be introduced, in order to increase the propellant surface area initially exposed to combustion and the core may have a wide variety of cross-sections such as circular, star, cross, dog-bone, wagon-wheel, etc. A BATES grain, which can be a multiple-segment, hollow cylindrical grain that is case bonded or otherwise has the external surface inhibited, the initial burning surface is that area of the core and segment ends.

In examples, the propellant grain includes a rocket propellant composition which is cast into a desired shape for the propellant for a rocket by casting the propellant composition into an appropriately shaped mold, typically, cylindrical in shape. The propellant grain may be of any conventional construction and fabricated in any conventional manner. Once positioned within a rocket motor, one or more end segments are ignited to initiate the combustion of the propellant grain.

Propellants for solid-rocket motors are made from a wide variety of substances. A variety of oxidizers known to the trade may be used, including but not limited to solid or semi-solid oxidizers such as ammonium perchlorate, ammonium nitrate, ammonium dinitramide, hydroxylammonium nitrate, hydroxylammonium perchlorate, hydrazinium nitroformate, nitronium perchlorate; liquid or semi-solid such as nitric acid, hydrogen peroxide. Alternatively, the oxidizer may be a so-called double based propellant i.e. nitrocellulose/nitroglycerine, optionally including ballistic modifiers, which may be alloyed with fluorine-containing polymers or other polymers to improve mechanical properties. The ratio of nitrocellulose (NC) to nitroglycerine (NG) may be varied to achieve a neutral or positive oxygen balance with increasing percentages of NG. With some ballistic modifiers e.g. copper and lead-based ballistic modifiers, double-based propellants may exhibit so-called plateau burning e.g. the propellant exhibits a substantially constant burn rate. Plateau burning, and reduced burn rates at higher pressures could act as a safety mechanism should the surface area of the propellant change e.g. due to voids, cracks or other problems. It is understood that other oxidizers could be used. It is also known that modifiers may be used in the oxidizing material. Such modifiers are known as used in solid propellant systems. Examples of modifiers would be burn rate modifiers such as ferrocene or ferrocene derivatives, borohydrides, copper chromite, oxamide, oxides or fluorides of iron, chromium, copper, lithium, magnesium, and others; thermally-conductive burn rate modifiers such as silver wire or graphite whiskers; coupling agents/rheology modifiers such as titanates, zirconates, aluminates; bonding agents; opacifiers, stabilizers, metal de-activators, anti-oxidants, or other agents known to the trade to modify processing, performance, mechanical properties, storage stability, munitions sensitivity, or shelf life. In addition to the above, the oxidizing material may contain one or more of the following: fuel additives, e.g. metal or non-metal powders, metal hydrides; energetic materials e.g. crystalline explosives such as HMX or RDX, liquid explosives such as TMETN or BTTN. In embodiments, the propellant composition may be 90-94% oxidizer, 2.5-4.5% ancillary compounds, 0.5-1.0% burn rate modifiers, 0.5-1.0% energetic metals, 0.2-0.5% process modifiers and 0.2-0.4% curative agents in binder. The process modifiers and curative agents relate to the particular binder system that is used, as will be understood. Certain embodiments of a propellant composition comprises ammonium perchlorate (a granular oxidizer), powdered aluminum (a fuel), and hydroxyl-terminated polybutadiene, or HTPB (a fuel that is liquid during mixing and that polymerizes to a rubbery binder during curing). This combination is used in major U.S. space boosters (e.g., the space shuttle and the Titan). Higher performance is achieved by the use of more energetic oxidizers (e.g., cyclotetramethylene tetranitramine [HMX]) and by energetic plasticizers in the binder or by energetic binders such as a nitrocellulose-nitroglycerin system.

As outlined above with respect to the term "resin", it is understood to include any suitable resin. It is also understood to include a resin blend comprising two or more resins. The resin can be any suitable synthetic resin, which includes thermosetting resins and thermoplastic resins. Such resins are normally in liquid state or are soluble or fusible and after being subjected to, for example, a chemical change caused by heating, catalyzing or other (e.g. photochemical reaction or the like), can be cross-linked to form a solid. Suitable resins include, for example, epoxy resin(s), unsaturated polyester resin(s), phenolic resin(s), carbamate ester resin(s) (e.g. urethane), amino resin(s), alkyd resin(s), silicone resin (s), or a combination thereof. Such resins can be enhanced by using a blend. In examples, resins such as epoxy resins, can be enhanced by mixing liquid carboxyl-terminated butadiene-acrylonitrile (CTBN) with epoxy resin prepolymers and then curing the resulting mixture under particular conditions. In addition to CTBN, other carboxyl-terminated rubbers (carboxyl-terminated polybutadiene (CTB), carboxyl-terminated styrene-butadiene rubber (CTBS), carboxyl-terminated polyether rubber (CTPE) or the like) and various hydroxy-terminated rubbers (liquid hydroxy-terminated nitrile rubber (HTBN), hydroxy-terminated polybutadiene (HTPB) or the like) can be used in blends. When the term "resin" is used in the rocket motor, it is understood to be in a physical form for coupling and, for example, substantially maintaining the position of the grains. When the term "resin" is used in the method, it is understood to be flowable prior to, for example, curing, and once the method is completed, it is in a physical form for coupling and, for example, substantially maintaining the position of the grains.

Any parts herein that can utilize a polymeric material can also comprise, where suitable a polycycloolefin derived from a ring-opening metathesis polymerization ("ROMP") reaction. Cyclic olefins can be polymerized through ROMP reactions to provide the polycycloolefin. In embodiments, the polycycloolefin of the cyclic olefin produced through metathesis polymerization reactions can have high strength, toughness and/or have chemical resistance over a wide range of temperatures, including, for example, temperatures as low as cryogenic temperatures. Certain temperatures can vary, for example, over about −50° C. to about 180° C. In embodiments, the polycycloolefins combine the attributes of thermoplastics, thermosets and fluoropolymers. Such polycycloolefins are considered to be Reaction Injection Molded (RIM) material.

Suitable monomers include cyclic olefins that can be polymerized using metathesis polymerization catalysts. Such cyclic olefins can be used as the resin injected into rocket motor as well. The cyclic olefins may be strained or unstrained, monocyclic or polycyclic, may optionally include heteroatoms, and may include one or more functional groups. One or more functional groups may be selected from hydroxyl, thiol, thioether, ketone, aldehyde, ester, ether, amine, imine, amide, nitro, carboxylic acid, disulfide, carbonate, isocyanate, carbodiimide, carboalkoxy, peroxy, anhydride, carbamate, and halogen. The cyclic olefins may include strained cyclic olefins or unstrained cyclic olefins, each of which may be functionalized or unfunctionalized. Embodiments herein contemplates preparation of homopolymers, as well as random and block copolymers and terpolymers of the suitable cyclic olefins. Suitable cyclic olefins include but are not limited to, substituted and unsubstituted, norbornene, norbornadiene, dicyclopentadiene, cyclobutene, cyclopentene, cycloheptene, cyclooctene, cyclononene, cyclodecene, cyclooctadiene, cyclononadiene, cyclododecene, 7-oxanorbornene, 7-oxanorbornadiene, and derivatives therefrom. Illustrative examples of suitable functional groups are listed above. Typical cyclic olefins include norbornene and dicyclopentadiene and their respective homologs and derivatives. In a typical embodiment, dicyclopentadiene ("DCPD") is used and it has a low viscosity that is similar to water. Poly-dicyclopentadiene (Poly-DCPD) is made from a ROMP reaction from the monomer endo-dicyclopentadiene.

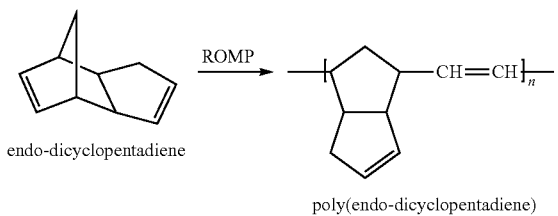

endo-dicyclopentadiene poly(endo-dicyclopentadiene)

Poly-DCPD can then undergo vinyl polymerization to produce cross-linked Poly-DCPD.

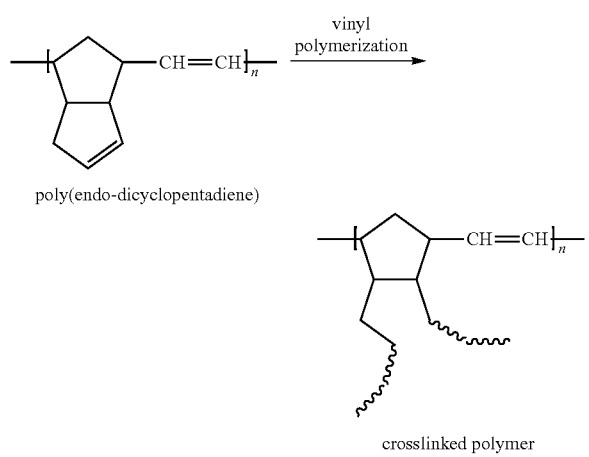

poly(endo-dicyclopentadiene)

crosslinked polymer

Poly-DCPD is highly cohesive during molding to itself and other materials, which permits multi-shot parts from the same mold cycle or secondary mold cycles possible.

Suitable dicyclopentadiene resins that may be used, for example, are Lyondell™ 108, Lyondell™ 103, PROXIMA™ HPR 2029, PROXIMA™ HPR 2102, PROXIMA™ ACR 4100, and PROXIMA™ HPR 2128. Other suitable cyclic olefins are described in U.S. Pat. Nos. 6,410,110, 4,943,621, 4,324,717 and 4,301,306, all of which are herein incorporated by reference, and include ethylidenenorbornene, methyltetracyclododecene, methylnorbornene, ethylnorbornene, dimethylnorbornene and similar derivatives, norbornadiene, cyclopentene, cycloheptene, cyclooctene, 7-oxanorbornene, 7-oxanorbornene derivatives, 7-oxabicyclo[2.2.1]hept-5ene derivatives, 7-oxanorbornadiene, cyclododecene, 2-norbornene, also named bicyclo[2.2.1]-2-heptene and substituted bicyclic norbornenes, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, 5-dodecyl-2-norbornene, 5-isobutyl-2-norbornene, 5-octadecyl-2-norbornene, 5-isopropyl-2-norbornene, 5-phenyl-2-norbornene, 5-p-toluyl-2-norbornene, 5-a-naphthyl-2-norbornene, 5-cyclohexyl-2-norbornene, 5,5-dimethyl-2-norbornene, dicyclopentadiene (or cyclopentadiene dimer), dihydrodicyclopentadiene (or cyclopentene cyclopentadiene codimer), methyl-cyclopentadiene dimer, ethyl-cyclopentadiene dimer, tetracyclododecene, also named 1,2,3,4,4a,5,8,8a-octahydro-1,4:5,8-dimethyanonaphthalene, 9-methyl-tetracyclo[$6.2.1.1^{3,6}.0^{2,7}$]-4-dodecene, also named 1,2,3,4,4a,5,8,8a-octahydro-2-methyl-4,4:5,8-dimethanonaphthalene, 9-ethyl-tetracyclo[$6.2.1.1^{3,6}.0^{2,7}$]-4-dodecene, 9-propyl-tetracyclo[$6.2.1.1^{3,6}.0^{2,7}$]-4-dodecene, 9-hexyl-tetracyclo[$6.2.1.1^{3,6}.0^{2,7}$]-4-dodecene, 9-decyl-tetracyclo[$6.2.1.1^{3,6}.0^{2,7}$]-4-dodecene, 9,10-dimethyl-tetracyclo[$6.2.1.1^{3,6}.0^{2,7}$]-4-dodecene, 9-ethyl, 10-methyl-tetracyclo[$6.2.1.1^{3,6}.0^{2,7}$]-4-dodecene, 9-cyclohexyl-tetracyclo[$6.2.1.1^{3,6}.0^{2,7}$]-4-dodecene, 9-chloro-tetracyclo[$6.2.1.1^{3,6}.0^{2,7}$]-4-dodecene, 9-bromo-tetracyclo[$6.2.1.1^{3,6}.0^{2,7}$]-4-dodecene, cyclopentadiene-trimer, methyl-cyclopentadiene-trimer, and the like.

The polycycloolefins derived from ROMP may be linear, branched and/or crosslinked polycycloolefins, linear, branched and/or crosslinked copolymer cycloolefins, or combinations thereof. The copolymer is understood to comprise two or more polymers.

In other embodiments, the cycloolefins have a low viscosity that is similar to water (about 0.9 cP at about 25° C.). In other embodiments, the viscosity of the cycloolefins can have a viscosity range greater than about 0 cP to about 1000 cP at about 25° C., from about 0.5 cP to about 1000 cP at about 25° C.; from about 0.5 cP to about 900 cP at about 25° C., from about 0.5 cP to about 800 cP at about 25° C., from about 0.5 cP to about 700 cP at about 25° C., from about 0.5 cP to about 600 cP at about 25° C., from about 0.5 cP to about 500 cP at about 25° C., from about 0.5 cP to about 400 cP at about 25° C., from about 0.5 cP to about 300 cP at about 25° C., from about 0.5 cP to about 200 cP at about 25° C., from about 0.5 cP to about 100 cP at about 25° C., from about 0.5 cP to about 50 cP at about 25° C., from about 0.5 cP to about 25 cP at about 25° C., from about 0.5 cP to about 20 cP at about 25° C., from about 0.5 cP to about 10 cP at about 25° C., from about 0.5 cP to about 5 cP at about 25° C., from about 0.5 cP to about 3 cP at about 25° C., from about 0.5 cP to about 2 cP at about 25° C., from about 0.9 cP to about 1000 cP at about 25° C.; from about 0.9 cP to about 900 cP at about 25° C., from about 0.9 cP to about 800 cP at about 25° C., from about 0.9 cP to about 700 cP at about 25° C., from about 0.9 cP to about 600 cP at about 25° C., from about 0.9 cP to about 500 cP at about 25° C., from about 0.9 cP to about 400 cP at about 25° C., from about 0.9 cP to about 300 cP at about 25° C., from about 0.9 cP to about 200 cP at about 25° C., from about 0.9 cP to about 100 cP at about 25° C., from about 0.9 cP to about 50 cP at about 25° C., from about 0.9 cP to about 25 cP at about 25° C., from about 0.9 cP to about 20 cP at about 25° C., from about 0.9 cP to about 10 cP at about 25° C., from about 0.9 cP to about 5 cP at about 25° C., from about 0.9 cP to about 3 cP at about 25° C., from about 200 cP to about 300 cP at about 25° C., or from about 900 cP to about 950 cP at about 25° C. The viscosity may be less than about 35 cP at about 25° C., less than about 10 cP at about 25° C., or less than about 8 cP at about 25° C.

In other embodiments, the polycycloolefins have a glass transition temperature of from about 100° C. to about 200° C.; from about 110° C. to about 200° C., from about 120° C. to about 200° C., from about 130° C. to about 200° C., from about 140° C. to about 200° C., from about 150° C. to about 200° C., from about 160° C. to about 200° C., from about 170° C. to about 200° C., from about 180° C. to about 200° C., from about 100° C. to about 190° C., from about 100° C. to about 180° C., from about 110° C. to about 190° C., from about 110° C. to about 180° C., from about 120° C. to about 180° C., from about 130° C. to about 180° C., from about 140° C. to about 180° C., from about 145° C. to about 180° C., from about 150° C. to about 180° C., or from about 160° C. to about 180° C.

In other embodiments, the polycycloolefins have compressive strength of from about 30 MPa to about 150 MPa, from about 40 MPa to about 150 MPa, from about 50 MPa to about 150 MPa, from about 60 MPa to about 150 MPa, from about 70 MPa to about 150 MPa, from about 80 MPa to about 150 MPa, from about 90 MPa to about 150 MPa, from about 50 MPa to about 130 MPa, from about 50 MPa to about 120 MPa, from about 50 MPa to about 110 MPa, from about 50 MPa to about 100 MPa, from about 60 MPa to about 100 MPa, from about 70 MPa to about 100 MPa, or from about 80 MPa to about 100 MPa.

In other embodiments, the polycycloolefins have tensile strength of from about 30 MPa to about 150 MPa, from about 40 MPa to about 150 MPa, from about 50 MPa to about 150 MPa, from about 60 MPa to about 150 MPa, from about 70 MPa to about 150 MPa, from about 80 MPa to about 150 MPa, from about 90 MPa to about 150 MPa, from about 50 MPa to about 130 MPa, from about 50 MPa to about 120 MPa, from about 50 MPa to about 110 MPa, from about 50 MPa to about 100 MPa, from about 60 MPa to about 100 MPa, from about 70 MPa to about 100 MPa, or from about 80 MPa to about 100 MPa.

In other embodiments, the polycyclolefins have one or more of the properties listed above (e.g. glass transition temperature, compressive strength, and tensile strength).

The cyclic olefin is polymerized through ROMP polymerization process, which includes contacting the cyclic olefin with a metathesis catalysts, such as ruthenium or osmium catalysts. The cyclic olefin is polymerized while using a polymer processing technique to form the polycycloolefin part. Suitable ruthenium and osmium carbene catalysts, the methods of synthesizing such catalysts, and suitable olefin monomers as well as the methods for performing and controlling the polymerization reaction, are disclosed in U.S. Pat. Nos. 5,312,940, 5,342,909, 5,342,940, 5,849,851, 5,831,108, 5,917,071, 6,383,319, 6,410,110 and WO 97/20865, all of which are incorporated herein by reference. Generally suitable catalysts are ruthenium and osmium carbene complex catalysts disclosed in these references. Some ruthenium and osmium carbene complex catalysts may also include those which are stable in the presence of a variety of functional groups including hydroxyl, thiol, thioether, ketone, aldehyde, ester, ether, amine, imine, amide, nitro, carboxylic acid, disulfide, carbonate, isocyanate, carbodiimide, carboalkoxy, peroxo, anhydride, carbamate, and halogen. When the catalysts are stable in the presence of these groups, the starting monomers, impurities in the monomer, the coupling agents, any substituent groups on the catalyst, and other additives may include one or more of the listed groups without substantially deactivating the catalysts.

The catalysts may be of the general formula

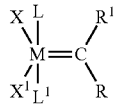

wherein:
M is ruthenium or osmium;
X and $X^1$ are each independently any anionic ligand;
L and $L^1$ are each independently any neutral electron donor ligand;
R and $R^1$ are each independently hydrogen or a substituent selected from the group consisting of $C_1$-$C_{20}$ alkyl, $C_2$-$C_{20}$ alkenyl, $C_2$-$C_{20}$ alkynyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl. Optionally, each of the R or $R^1$ substituent group may be substituted with one or more moieties selected from the group consisting of $C_1$-$C_{10}$ alkyl, $C_1$-$C_{10}$ alkoxy, and aryl which in turn may each be further substituted with one or more groups selected from a halogen, a $C_1$-$C_5$ alkyl, $C_1$-$C_5$ alkoxy, and phenyl. Moreover, any of the catalyst ligands may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

In certain embodiments of these catalysts, the R substituent is hydrogen and the $R^1$ substituent is selected from the group consisting of $C_1$-$C_{20}$ alkyl, $C_2$-$C_{20}$ alkenyl, and aryl. In typical embodiments, the $R^1$ substituent is phenyl or vinyl, optionally substituted with one or more moieties selected from the group consisting of $C_1$-$C_5$ alkyl, $C_1$-$C_5$ alkoxy, phenyl, and a functional group. In other embodiments, the $R^1$ substituent is phenyl or —C=C(CH$_3$)$_2$.

In certain embodiments of these catalysts, L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether. In typical embodiments, L and $L^1$ are each a phosphine of the formula $PR^3R^4R^5$, where $R^3$, $R^4$, and $R^5$ are each independently aryl or $C_1$-$C_{10}$ alkyl, particularly primary alkyl, secondary alkyl or cycloalkyl. In the other embodiments, L and $L^1$ ligands are each selected from the group consisting of —P(cyclohexyl)$_3$, —P(cyclopentyl)$_3$, —P(isopropyl)$_3$, and —P(phenyl)$_3$.

In certain embodiments of these catalysts, X and $X^1$ are each independently hydrogen, halide, or one of the following groups: $C_1$-$C_{20}$ alkyl, aryl, $C_1$-$C_{20}$ alkoxide, aryloxide, $C_3$-$C_{20}$ alkyldiketonate, aryldiketonate, $C_1$-$C_{20}$ carboxylate, arylsulfonate, $C_1$-$C_{20}$ alkylsulfonate, $C_1$-$C_{20}$ alkylthio, $C_1$-$C_{20}$ alkylsulfonyl, or $C_1$-$C_{20}$ alkylsulfinyl. Optionally, X and $X^1$ may be substituted with one or more moieties selected from the group consisting of $C_1$-$C_{10}$ alkyl, $C_1$-$C_{10}$ alkoxy, and aryl which in turn may each be further substituted with one or more groups selected from halogen, $C_1$-$C_5$ alkyl, $C_1$-$C_5$ alkoxy, and phenyl. In typical embodiments, X and $X^1$ are halide, benzoate, $C_1$-$C_5$ carboxylate, $C_1$-$C_5$ alkyl, phenoxy, $C_1$-$C_5$ alkoxy, $C_1$-$C_5$ alkylthio, aryl, and $C_1$-$C_5$ alkyl sulfonate. In other embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In the most preferred embodiments, X and $X^1$ are each chloride.

Particularly preferred catalysts can be represented by the formulas:

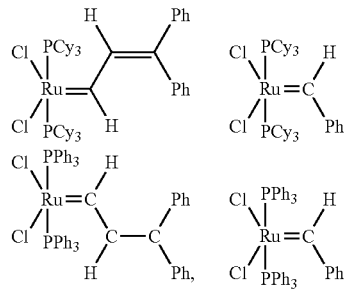

where Cy is cyclopentyl or cyclohexyl, and Ph is phenyl. A typical catalyst can be represented by the formula:

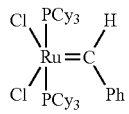

where Cy is cyclopentyl or cyclohexyl, and Ph is phenyl.

The catalysts described above are useful in polymerization of a wide variety of cyclic olefins through ROMP. Examples of commercial catalysts include PROXIMA™ CT 762, Grubbs Catalyst™ M37a (C884), Grubbs Catalyst™ M2a (C848), and Hoveyda-Grubbs Catalyst™ M72 (C627).

The ROMP polymerization of the cyclic monomer may occur either in the presence or absence of solvent and may optionally include other additives. Additives may include, without being limited thereto, antistatics, antioxidants (primary antioxidants, secondary antioxidants, or mixtures thereof), light stabilizers, plasticizers, dyes, pigments, fillers, reinforcement materials, lubricants, adhesion promoters, viscosity-increasing agents, viscosity-decreasing agents and demolding enhancers. In addition, other additives may include materials that modulate the activity of the catalyst (e.g. to either retard the activity such as triphenylphosphone or to enhance the activity).

In embodiments, the reaction can be conducted in the absence of a solvent. However, solvents may be used such as organic, protic, or aqueous solvents which are typically inert under the reaction conditions. Examples of suitable solvents may include aromatic hydrocarbons, chlorinated hydrocarbons, ethers, aliphatic hydrocarbons, alcohols, water, or mixtures thereof.

With respect to reinforcement materials, the resultant polycycloolefins may be reinforced or unreinforced. Suitable reinforcing materials include those that add to the strength or stiffness of the part when incorporated with the polymer. Reinforcing material can be in the form of filaments, fibres, rovings, mats, weaves, fabrics, or other known structures and composites. In typical embodiments, the reinforcing material is in filament or fibre form such as, for example, metal or carbon fibres (e.g. Toray T700S (50C Sizing), Zoltek™ PX 35, Mitsubishi Rayon Grafil™ Carbon fiber 34-700 24K (K sizing), and SGL C U320-0/ST or SGL C B300-090/ST).

Representative suitable reinforcement materials include barium sulfate; minerals, such as glass, carbon, graphite, ceramic, boron, and the like; metallic materials; organic polymers, such as aromatic polyamides including the aramid fibers, such as Kevlar®, and polybenzimide, polybenzoxazol, polybenzothiazol, polyesters, and the like; polyolefins; fluoropolymer, such as Halar®; cellulosic materials; and other material known to be useful as reinforcing material for polymer systems. Examples of other commercially available reinforcing materials include the following products: Fiberfrax® from Unifrax Corporation, Interfil® from Akzo Nobel, and wollastonite from Nyco. Fiber glass or fiber glass knitted into a fabric are preferred. Examples include: PPG Hybon®2026, Owens Corning SE 1200, and 3B SE 3030. The reinforcing materials may be "sized", i.e., treated or coated with a coupling agent, often also referred to as a sizing or bonding agent, to render them more compatible for adhering with the olefin polymer matrix. As used herein, "coupling agent" means any material that can be applied to a reinforcing material that improves adhesion/wetout between the reinforcement materials and the polyolefin. Suitable coupling agents include a variety of conventional chromium; silane; titanate; zirconate, zirco-aluminate, and hydroxyl terminated amphaphilic coupling agents. Preferably, those which do not contain the following functionalities: vinyl ethers; active oxygen functionalities such as hydroperoxides or activated epoxides; acetylenes; and other Lewis bases that may poison or adversely affect the ruthenium or osmium catalyst.

The parameters for the metathesis polymerization reactions used, such as the atmosphere, the ratio of catalyst to cyclic olefin, the reaction temperatures, the solvents that may be used, the additives and other agents that may be present during the polymerization reaction, and the methods for carrying out the metathesis polymerization are discussed in the incorporated references identified above. Generally, the polymerization of the cyclic olefin is carried out by adding the desired metathesis catalyst to the monomer starting material which has been heated to a starting resin temperature. Alternatively, the catalyst may be first added to the monomer starting material and the mixture then heated to the required temperature. The temperature may affect the rate of the polymerization reaction. Generally, the reaction temperature will be in the range of about 10° C. to about 500° C., and typically, about 25° C. to about 450° C.

Any suitable ratio of catalyst to cyclic olefin may be used. The ratio of catalyst to cyclic olefin may be within the range from about 1:5 to about 1:100 (wt/wt). Various example of ratios of catalyst to cyclic olefin is from about 1:10 to about 1:100 (wt/wt), from about 1:15 to about 1:100 (wt/wt), from about 1:20 to about 1:100 (wt/wt), from about 1:25 to about 1:100 (wt/wt), from about 1:30 to about 1:100 (wt/wt), from about 1:35 to about 1:100 (wt/wt), from about 1:40 to about 1:100 (wt/wt), from about 1:45 to about 1:100, from about 1:50 to about 1:100 (wt/wt), from about 1:55 to about 1:100 (wt/wt), from about 1:60 to about 1:100 (wt/wt), from about 1:70 to about 1:100 (wt/wt), from about 1:80 to about 1:100 (wt/wt), from about 1:10 to about 1:90 (wt/wt), from about 1:15 to about 1:80 (wt/wt), from about 1:20 to about 1:70 (wt/wt), from about 1:25 to about 1:65 (wt/wt), from about 1:30 to about 1:65 (wt/wt), from about 1:35 to about 1:65 (wt/wt), from about 1:40 to about 1:65 (wt/wt), from about 1:45 to about 1:60, from about 1:50 to about 1:60 (wt/wt), or from about 1:50 to about 1:55 (wt/wt). The method may be practiced using catalyst/cyclic olefin ratios outside of the above ranges.

After polymerization is complete, the part may be post cured to initiate increased cross-linking. Additional cross-linking may be accomplished by post-curing at an elevated temperature (e.g. about 100° C. to about 120° C. for a suitable time, such as about 1 hour). Other methods may be used to post-cure the polyolefin material. The cyclic olefin may optionally include one or more cross-linking agents for initiating additional post cure cross-linking of the polyolefin.

Reaction Injection Molding (RIM) can be employed as the polymerization process. In this process, the cyclic olefin may be injected and polymerization can take place inside a mold. This can produce parts with fine detail and finishes and can also incorporate infused composite reinforcements that may not be possible with thermoplastics due to their high melt viscosities.

Any other suitable method may be used to form the part comprising polycycloolefin derived from ring-opening metathesis polymerization (ROMP) reaction of a cyclic olefin using any of the suitable cyclic olefins, temperatures, and ratios of starting materials disclosed herein.

Patent applications, patents, and publications are cited herein to assist in understanding the embodiments described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

Although specific embodiments of the invention have been disclosed herein in detail, it will be understood by those skilled in the art that variations may be made thereto without departing from the spirit of the invention or the scope of the appended claims.

It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A rocket motor comprising:
   at least two propellant grains;
   a case comprising the propellant grains, stacked within the case; and
   a resin for substantially maintaining the propellant grains in position within the case;
   wherein the resin comprises polycycloolefin derived from ring-opening metathesis polymerization (ROMP) reaction of a cyclic olefin.

2. The rocket motor of claim 1, wherein at least one of the following:
   i) the propellant grains are stacked and spaced within the case,
   ii) each of the propellant grains have an aft-end face and a fore-end face, and the fore-end face of one propellant grain is spaced from the aft-end face of an adjacent propellant grain creating a gap therebetween; and
   iii) at least one of the propellant grains comprises a sleeve having propellant cast therein.

3. The rocket motor of claim 2, wherein the sleeve is cylindrical.

4. The rocket motor of claim 2, wherein the sleeve surrounds the propellant, the propellant having a bore therethrough.

5. The rocket motor of claim 2, wherein at least two of the propellant grains have sleeves, the sleeve of one propellant grain being coupled to the sleeve of an adjacent propellant grain, wherein the fore-end face of one propellant grain is spaced from the aft-end face of another propellant grain creating the gap therebetween.

6. The rocket motor of claim 5, wherein a fore-end portion of the sleeve of one propellant grain is coupled to an aft-end portion of the sleeve of the adjacent propellant grain.

7. The rocket motor of claim 2, wherein at least one sleeve has a connector.

8. The rocket motor of claim 7, wherein the connector is integral with the at least one sleeve.

9. The rocket motor of claim 7, wherein each sleeve is shaped to have a connector for engaging and connecting to the sleeve of at least one other propellant grain to stack the propellant grains end-to-end.

10. The rocket motor of claim 2, wherein the sleeve of one propellant grain is coupled to the sleeve of an adjacent propellant grain through any one of tongue and groove, socket and spigot, lap joints, or butt joints.

11. The rocket motor of claim 2, wherein the sleeve is an inhibitor liner.

12. The rocket motor of claim 2, wherein the sleeve comprises a sleeve and a liner.

13. The rocket motor of claim 12, wherein the sleeve is an insulation sleeve and the liner is an inhibitor liner.

14. The rocket motor of claim 12, wherein the propellant grains are coupled through the sleeves, through the liners or through both.

15. The rocket motor of claim 2, wherein the resin bonds the propellant grains to the case.

16. The rocket motor of claim 2, wherein a cavity between the propellant grains and the case is filled with the resin, which couples the propellant grains to the case.

17. The rocket motor of claim 1, wherein at least one of the propellant grains comprises a Ballistic Test and Evaluation System (BATES) grain.

18. The rocket motor of claim 17, wherein the spacers create a cavity between the propellant grains and the case.

19. The rocket motor of claim 1, further comprising spacers to center the propellant grains.

20. The rocket motor of claim 19, wherein:
   i) the spacers are coupled to the case;
   ii) the spacers are coupled to at least one propellant grain; or
   ii) the spacers are coupled to at least one sleeve of at least one propellant grain.

21. The rocket motor of claim 20, wherein:
   i) the spacers are integrally coupled to the case;
   ii) the spacers are integrally coupled to at least one propellant grain; or
   ii) the spacers are integrally coupled to at least one sleeve of at least one propellant grain.

22. The rocket motor of claim 20, wherein the spacers are longitudinal spacers and/or latitudinal spacers.

23. A rocket comprising the rocket motor of claim 1.

24. The rocket motor of claim 1, wherein the resin comprises a synthetic resin.

25. The rocket motor of claim 1, wherein the resin comprises thermosetting resins and/or thermoplastic resins.

26. The rocket motor of claim 1, wherein the resin further comprises carboxyl-terminated butadiene-acrylonitrile (CTBN), carboxyl-terminated rubbers (carboxyl-terminated polybutadiene (CTB), carboxyl-terminated styrene-butadiene rubber (CTBS), carboxyl-terminated polyether rubber (CTPE), hydroxy-terminated rubbers (liquid hydroxy-terminated nitrile rubber (HTBN), and/or hydroxy-terminated polybutadiene (HTPB).

27. The rocket motor of claim 1, wherein the cyclic olefin is Reaction Injection Molded (RIM) material.

28. The rocket motor of claim 27, wherein the cyclic olefin comprises dicyclopentadiene (DCPD) resins, DCPD resin having a purity of 94.6%, DCPD resin having a purity greater than 95%, poly-DCPD, ethylidenenorbornene, methyltetracyclododecene, methylnorbornene, ethylnorbornene, dimethylnorbornene, norbornadiene, cyclopentene, cycloheptene, cyclooctene, 7-oxanorbornene, 7-oxanorbornene derivatives, 7-oxabicyclo[2.2.1]hept-5ene derivatives, 7-oxanorbornadiene, cyclododecene, 2-norbornene, also named bicyclo[2.2.1]-2-heptene and substituted bicyclic norbornenes, 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, 5-dodecyl-2-norbornene, 5-isobutyl-2-norbornene, 5-octadecyl-2-norbornene, 5-isopropyl-2-norbornene, 5-phenyl-2-norbornene, 5-p-toluyl-2-norbornene, 5-a-naphthyl-2-norbornene, 5-cyclohexyl-2-norbornene, 5,5-dimethyl-2-norbornene, dicyclopentadiene (or cyclopentadiene dimer), dihydrodicyclopentadiene (or cyclopentene cyclopentadiene codimer), methyl-cyclopentadiene dimer, ethyl-cyclopentadiene dimer, tetracyclododecene, also named 1,2,3,4,4a,5,8,8a-octahydro-1,4:5,8-dimethyanonaphthalene, 9-methyl-tetracyclo[6.2.1.1$^{3,6}$.0$^{2,7}$]-4-dodecene, also named 1,2,3,4,4a,5,8,8a-octahydro-2-methyl-4,4:5,8-dimethanonaphthalene, 9-ethyl-tetracyclo[6.2.1.1$^{3,6}$.0$^{2,7}$]-4-dodecene, 9-propyl-tetracyclo[6.2.1.1$^{3,6}$.0$^{2,7}$]-4-dodecene, 9-hexyl-tetracyclo[6.2.1.1$^{3,6}$.0$^{2,7}$]-4-dodecene, 9-decyl-tetracyclo[6.2.1.1$^{3,6}$.0$^{2,7}$]-4-dodecene, 9,10-dimethyl-tetracyclo[6.2.1.1$^{3,6}$.0$^{2,7}$]-4-dodecene, 9-ethyl, 10-methyl-tetracyclo[6.2.1.1$^{3,6}$.0$^{2,7}$]-4-dodecene, 9-cyclohexyl-tetracyclo[6.2.1.1$^{3,6}$.0$^{2,7}$]-4-dodecene, 9-chloro-tetracyclo [6.2.1.1$^{3,6}$.0$^{2,7}$]-4-dodecene, 9-bromo-tetracyclo[6.2.1.1$^{3,6}$.0$^{2,7}$]-4-dodecene, cyclopentadiene-trimer, methyl-cyclopentadiene-trimer, or a combination thereof.

29. The rocket motor of claim 27, wherein the resin further comprises a reinforcement material.

30. The rocket motor of claim 29, wherein the reinforcement material is selected from filament(s) and/or fiber(s).

31. The rocket motor of claim 1, wherein the resin further comprises poly-DCPD (poly-dicyclopentadiene).

* * * * *